United States Patent
Moraes

(10) Patent No.: US 8,993,867 B2
(45) Date of Patent: Mar. 31, 2015

(54) MOBILE COMMUNICATION DEVICE WITH MUSICAL INSTRUMENT FUNCTIONS

(75) Inventor: Aurélio Rotolo Moraes, Curitiba (BR)

(73) Assignee: Audiobrax Indústria E Comércio de Produtos Eletrônicos S/A, Curitiba (BR)

( * ) Notice: Subject to any disclaimer, the term of this patent is extended or adjusted under 35 U.S.C. 154(b) by 2219 days.

(21) Appl. No.: 11/815,257

(22) PCT Filed: Feb. 1, 2006

(86) PCT No.: PCT/BR2006/000012
§ 371 (c)(1),
(2), (4) Date: Feb. 29, 2008

(87) PCT Pub. No.: WO2006/081643
PCT Pub. Date: Aug. 10, 2006

(65) Prior Publication Data
US 2008/0254824 A1 Oct. 16, 2008

(30) Foreign Application Priority Data
Feb. 2, 2005 (BR) ...................................... 0500339
Jan. 20, 2006 (BR) ....................................... 600647

(51) Int. Cl.
*G10H 1/08* (2006.01)
*G10H 7/00* (2006.01)
(Continued)

(52) U.S. Cl.
CPC .. *G10H 7/00* (2013.01); *A45F 5/00* (2013.01); *G10H 1/32* (2013.01); *G10H 1/365* (2013.01);
(Continued)

(58) Field of Classification Search
USPC .................... 84/723, 730, 737, 743, 615, 625
See application file for complete search history.

(56) References Cited

U.S. PATENT DOCUMENTS

| 5,153,829 A | 10/1992 | Furuya et al. |
| 5,567,162 A | 10/1996 | Park |

(Continued)

FOREIGN PATENT DOCUMENTS

| EP | 0 507 355 | 10/1997 |
| JP | 2002 156982 | 5/2002 |

OTHER PUBLICATIONS

Dennis Hromin et al.; *CodeBLUE: A Bluetooth Interactive Dance Club System*; IEEE Global Telecommunications Conference. Conference Proceedings, Dec. 1, 2003, San Francisco, CA; IEEE Global Telecommunications Conference, Dec. 1-5, 2003, New York, NY; pp. 2814-2818.

(Continued)

*Primary Examiner* — Jeffrey Donels
(74) *Attorney, Agent, or Firm* — Alston & Bird LLP

(57) ABSTRACT

Describes a mobile communication device (1, 20, 55, 111, 150, 200, 220, 335) having musical instrument (percussion, keyboards, string and blow) function, which "can be scrapped onto the user's body through an adjustable elastic belt (151). It is also able to receive commands from a remote sensor (4, 70, 75, 160, 210, 257, 392, 412), which has a musical instrument interface (percussion, keyboards, string and blow), preferably scrapped onto the user's body by means of an adjustable elastic belt (151). A sound system (6) or an audio/video equipment might receive audio and/or video from the mobile communication device (1, 20, 55, 111, 150, 200, 220, 335) through an adapter (5, 56, 63, 68). The use of this device is intended to be an occupational therapy, satisfying, entertaining and relaxing for the user, which will provide user's mental and physical health benefits. Its technical classification is under "electronics".

13 Claims, 19 Drawing Sheets

(51) Int. Cl.
  *G10H 3/00* (2006.01)
  *A45F 5/00* (2006.01)
  *G10H 1/32* (2006.01)
  *G10H 1/36* (2006.01)
  *H04M 1/725* (2006.01)

(52) U.S. Cl.
  CPC ........ *H04M 1/72522* (2013.01); *H04M 1/7253* (2013.01); *A45F 2005/008* (2013.01); *G10H 2220/321* (2013.01); *G10H 2240/251* (2013.01); *G10H 2250/435* (2013.01); *G10H 2250/441* (2013.01); *H04M 1/72558* (2013.01); *H04M 2250/22* (2013.01); *G10H 2220/091* (2013.01)
  USPC .............................................. 84/625; 84/723

(56) References Cited

U.S. PATENT DOCUMENTS

| | | | |
|---|---|---|---|
| 5,841,052 A * | 11/1998 | Stanton | 84/600 |
| 6,345,751 B1 * | 2/2002 | Elliot | 224/646 |
| 6,514,150 B1 * | 2/2003 | Corder | 473/214 |
| 6,541,690 B1 * | 4/2003 | Segers, Jr. | 84/605 |
| 6,670,535 B2 * | 12/2003 | Anderson et al. | 84/443 |
| 6,751,439 B2 | 6/2004 | Tice et al. | |
| 6,779,116 B2 * | 8/2004 | Tagawa et al. | 713/193 |
| 6,809,247 B2 * | 10/2004 | Yamada et al. | 84/612 |
| 7,042,814 B2 * | 5/2006 | Yamada et al. | 369/30.26 |
| 7,050,573 B2 * | 5/2006 | Okazaki et al. | 379/373.02 |
| 7,054,914 B2 * | 5/2006 | Suzuki et al. | 709/217 |
| 7,095,402 B2 * | 8/2006 | Kunii et al. | 345/169 |
| 7,115,807 B2 * | 10/2006 | Yamada et al. | 84/602 |
| 7,164,076 B2 | 1/2007 | McHale et al. | |
| 7,197,149 B1 * | 3/2007 | Mita et al. | 381/98 |
| 7,199,298 B2 | 4/2007 | Funaki | |
| 7,230,605 B2 * | 6/2007 | Rekimoto et al. | 345/158 |
| 7,257,072 B2 * | 8/2007 | Kikuchi | 369/53.43 |
| 7,312,785 B2 * | 12/2007 | Tsuk et al. | 345/156 |
| 7,345,671 B2 * | 3/2008 | Robbin et al. | 345/156 |
| 7,418,671 B2 * | 8/2008 | Hama et al. | 715/830 |
| 7,446,254 B2 * | 11/2008 | Lee | 84/723 |
| 7,495,659 B2 * | 2/2009 | Marriott et al. | 345/173 |
| 7,499,040 B2 * | 3/2009 | Zadesky et al. | 345/204 |
| 7,525,037 B2 * | 4/2009 | Hansson et al. | 84/615 |
| 7,538,266 B2 | 5/2009 | Takehisa | |
| 7,555,291 B2 * | 6/2009 | Wassingbo | 455/414.1 |
| 7,627,343 B2 * | 12/2009 | Fadell et al. | 455/557 |
| 7,664,558 B2 * | 2/2010 | Lindahl et al. | 700/94 |
| 7,735,012 B2 * | 6/2010 | Naik | 715/727 |
| 7,800,592 B2 * | 9/2010 | Kerr et al. | 345/173 |
| 8,148,621 B2 | 4/2012 | Bright et al. | |
| 8,629,342 B2 | 1/2014 | Lee et al. | |
| 2001/0004861 A1 | 6/2001 | Suzuki et al. | |
| 2001/0039870 A1 | 11/2001 | Shimaya et al. | |
| 2003/0061115 A1 | 3/2003 | Wachi | |
| 2003/0167903 A1 | 9/2003 | Funaki | |
| 2004/0024478 A1 * | 2/2004 | Hans et al. | 700/94 |
| 2004/0055441 A1 | 3/2004 | Katsuta | |
| 2004/0089136 A1 | 5/2004 | Georges et al. | |
| 2004/0123726 A1 | 7/2004 | Kato et al. | |
| 2004/0154461 A1 | 8/2004 | Havukainen et al. | |
| 2005/0034591 A1 * | 2/2005 | Chang | 84/730 |
| 2006/0005693 A1 * | 1/2006 | Nishibori et al. | 84/723 |
| 2006/0109102 A1 * | 5/2006 | Gortz et al. | 340/531 |
| 2006/0123982 A1 * | 6/2006 | Christensen | 84/723 |
| 2007/0021152 A1 * | 1/2007 | Jung | 455/564 |
| 2007/0132837 A1 * | 6/2007 | Eom et al. | 348/14.02 |
| 2008/0078281 A1 | 4/2008 | Katsuta | |
| 2009/0148135 A1 | 6/2009 | Ishino et al. | |
| 2013/0074679 A1 | 3/2013 | Minamitaka | |
| 2013/0081531 A1 | 4/2013 | Minamitaka | |

OTHER PUBLICATIONS

International Search Report for PCT Application No. PCT/BR2006/000012; Filed Feb. 1, 2006; Date of Completion Jun. 1, 2006; Date ofMailing Jun. 9, 2006.
Written Opinion for PCT Application No. PCT/BR2006/000012; Filed Feb. 1, 2006.
Reply to Written Opinion dated Dec. 1, 2006.
International Preliminary Report on Patentability; Date of Submission of the Demand Dec. 4, 2006; Date of Completion of the Report May 7, 2007.

* cited by examiner

MOBILE COMMUNICATION DEVICE WITH MUSICAL INSTRUMENT FUNCTIONS

The present invention is referred to a mobile communication device, with musical instruments functionalities, practical to the user, fastened or not to the body, or in different situations. It is classified under the "electronics" sector.

The Patent Application PI0500339-3 of Feb. 2, 2005 of the same applicant and whose inner priority are herein claimed, describe a mobile communication device with instrumental functions, which are now added of some more technical innovations, which do not change the inventive concept.

DESCRIPTION OF THE PRIOR ART

The technical evolution and the industrial expansion changed the routine of people, resulting in less time for family and recreation time, apart the increasing stress. The active population's longs to have pleasurable moments, in suitable places, such as: open country, beach, ranch, etc. It is inevitable to remain, during the week, in chaotic environments, unpleasant and most part of the time inside a vehicle. Unfortunately, most people who work don't have time to leave the everyday surroundings, not even for a moment of recreation and pleasure.

The telecommunications technology advanced significantly in the last years, allowing people from different status to have access to a mobile electronic device, like a cellular kind. The large absorption of devices and services make the price reduce more and more. A group of these devices comprise apparatus to make them even more useful and innovating, making good quality use of its functions, such as short text messages, calendar, schedule, etc. They can also entertain the user, by means of games, songs, diverse sounds and other applications. Although the evolution of resources and games are expanding, the devices can be useful into other activities. Therefore, the present invention incline to provide the user a mobile communication device with instrumental and sounds resources, with the purpose to function as an occupational therapy, providing satisfying and entertaining instants, on idle moments that the user has throughout the day.

As a result, the idea of the present invention is to conciliate a musical instrument to the mobile communication device which people carry during the day. Consequently, the user can fasten the device to his body and play his favorite instrument, with the purpose of creating musical instruments sounds (percussion, keyboards, string or blow) or make an instrumental accompaniment of the song, from the own communication device, listening to sounds through phones, on the device itself or in other audio apparatus. The motivation to keep on using these instrumental resources emerge on the evaluation of the user's performance on the act of playing, the best possible way, the musical instrument of this device, which evaluates the instrumental accompaniment of a song, or else, the composition of a melody or song.

INVENTION OBJECTS

Is an object of the present invention provide a mobile communication device, whose primarily purpose is to make phone calls, with a musical instrument (percussion, keyboards, string, or blow), able to produce musical instruments sounds, whether percussion, keyboards, string, or blow, as well as produce sound and/or musical effects in a song being played by this device, which also evaluates the user's activity performance to accompany the song or producing a melody, a sound or even a song. Through the device of this invention, it is expected that the described functionalities will act as an occupational therapy, providing satisfying moments, resulting in physical and mental health to the user and less space to harmful thoughts.

BRIEF DESCRIPTION OF THE INVENTION

The object of the present invention consists basically of an adapter 5, a remote sensor 4 and a mobile communication device 1 that can have a physical musical instrument attached (percussion, keyboards, string or blow), which is able to function as a mobile phone, providing a musical instrument and sound, musicals, instrumentals resources and evaluate the user's performance, giving the equipment multiple functionalities and, among these, serve as a device able to function as a pleasant, satisfying and entertaining occupational therapy, resulting in several benefits to the user's physical and mental health.

The first and preferred embodiment of the electronic device of the present invention comprises an adapter 5,56,63,68 and a mobile communication device with an instrumental interface 20,150,200,220,335 presented in four modalities 150, 200,220,335 which include all the available functionalities of the device of the present invention. This device primarily functions as a mobile phone compatible with a cellular network and/or Wi-Fi (Wireless Fidelity), due to comprising electronic and computer resources to execute this function. At least one sensor 48,40 is set on the physical musical instrument, resulting in analog or digital electric signals, which are processed and interpreted, creating musical instruments sounds (percussion, keyboards, string or blow), which can be different from the type of the physical musical instrument, that is, whether the musical instrument is a piano, the produced sounds can be compatible with a drum or guitar, harp, etc.

The second embodiment of the device object of the present invention is composed of the first modality of the mobile communication device 55,111, by a remote sensor 4 and the adapter 5,56,63,68.

There are five modalities to the remote sensor 160,210, 257,392,412; each one intends to embody an existing physical musical instrument (percussion, keyboards, string or blow). The purpose of the remote sensor 4 is to send digitalized commands to the mobile communication device 1, concerning the user's action of playing the instrument. This act of touching the instrument stimulates the sensors 48,40, adequately set on the physical instrument, which produce analog or digital electric signals, which are processed and converted into commands.

The mobile communication device of the second embodiment 55,111 does not present an associated musical instrument, however it is able to receive digitalized commands, originated from the remote sensor 4, interpret and produce digitalized sounds corresponding to these commands. This device also acts as a mobile phone compatible with a cellular network and/or Wi-Fi, given that there are electronic and computer resources to execute this function. The type of physical instrument and remote sensor 4 commands, in every modality, are detected automatically by the mobile communication device 1.

Considering the first and second embodiments, their common characteristics will be approached. The activity performance of the user on playing the instrument, accompanying a song, creating melodies, sounds or even a song, can be evaluated through established parameters, such as: intensity, synchronism/rhythm, tone, timbre, musical note, selected instrument and musical style. The mobile communication device 1 is able to play a song, produce instrumental sounds, mix two or more sounds, modify and/or edit a song, while the individual sound, mixed or the resulting sound can be heard on wired or wireless earphones 2, stored in the internal Flash memory 36, sent to a computer 3 and/or home, automotive or portable sound system 6. As a result, the user can be inside a motor vehicle and listen to the resulting sounds on the loudspeakers of the vehicle. The sounds, melodies or songs produced by the user can be recorded, stored inside and be sent through audio-message or musical message, another innovating resource of this invention.

Another innovating characteristic is that the user can make use of his skills to produce sounds, such as whistles, finger cracks, clapped hands, vocal sounds emitted by the lips, tap dance or any other originated sound, with the purpose to stimulate the mobile communication device 1, which receives these sounds through its internal microphone 34, processing and interpreting the stimulus in order to produce musical instrument sounds, be it a percussion, keyboards, string or blow instrument. Based on that, diverse parameters of the produced sounds are considered, such as intensity, tone, timbre, acoustic signal shape, frequency, duration time, sounded vocal and its type, harmonic frequencies and/or other important parameters to define the production of an instrument sound.

Through an adjustable elastic belt 151, Velcro® straps or adhesive portions 153,152, which are presented in all modalities of the communication devices and remote sensors, it is possible to fasten the devices onto the user's body.

BRIEF DESCRIPTION OF THE DRAWINGS

The present invention will be described based on the following depicted drawings and diagrams. The figures show.

DETAILED DESCRIPTION OF THE INVENTION

The detailed description of the figures will enlighten the idea of the present invention, and also will depict its details, functionalities and particularities of the elements, which comprise an electronic device object of the present invention.

Figure 1:
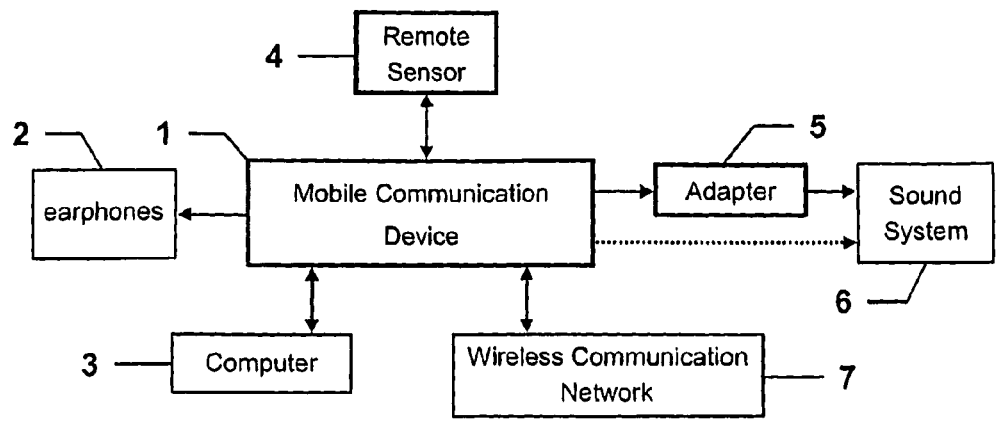
FIG. 1—is a functional block diagram which comprises the elements that interact with the mobile communication device 1.

The block diagram of FIG. 1 presents the electronic device of the present invention that comprises the mobile communication device 1, remote sensor 4 and the adapter 5, which interact with accessories elements 3,2,7,6. The mobile communication device 1 is equipped with analog and digital electronic circuits, in association with the embedded software, it composes a system able to produce musical instruments sounds (percussion, keyboard, string or blow instruments), play music, add sound effects, modify parameters of the music being played, mix sounds and evaluate the user's performance and skills related to instrumental accompaniment, directly or indirectly acting in all of these functionalities.

The mobile communication device 1 is able communicate with the computer 3, in order to receive or change files, access and synchronize schedule, calendar and contacts, among other possibilities. Digitalized sounds can be sent from the mobile communication device 1 to a home, automotive or portable audio system 6, which receives sounds, decodes and plays them. The remote sensor 4 provides a musical instrument interface to control the mobile communication device 1, which is able to send the resulting sound to wired or wireless earphones 2. A wireless network 7, of cellular type or one that allows voice and/or data communication, is necessary to provide the primary functions of the mobile communication device 1.

Figure 2:
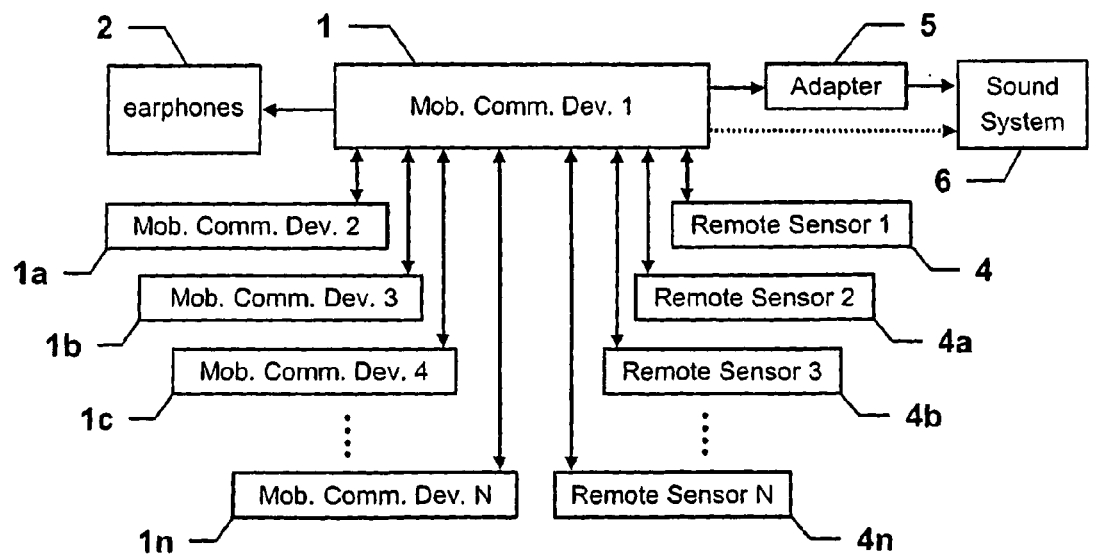
FIG. 2—is a block diagram that illustrates some possible configurations of use of the mobile communication device 1 and remote sensor 4, both devices being objects of the present invention.

The electronic device of the present invention is featured by two embodiments. The first embodiment consists basically of a mobile communication device with an instrumental interface 20. This embodiment accepts the use of more than one remote sensor 4,4a,4b . . . 4n or mobile communication device with instrumental interface 1a,1b,1c . . . 1n, as shown on FIG. 2. Therefore, additional instrumental interfaces are provided for other users that can operate together in order to perform musical accompaniment or to compose a song, because the mobile communication device provides communication with more than one remote sensor 4,4a,4b . . . 4n or mobile communication device 20. The second embodiment comprises a mobile communication device without instrumental interface 55, which can be achieved by the use of at least one remote sensor 4,4a,4b . . . 4n. The device of this embodiment 55 can also function with the device of the first embodiment 20, using its instrumental interface. The adapter 5, object of the present invention, works in both embodiments and has the purpose to deliver the sound produced in the mobile communication device 1 to a sound system 6 not compatible with the communication resources of the device.

Figure 3:
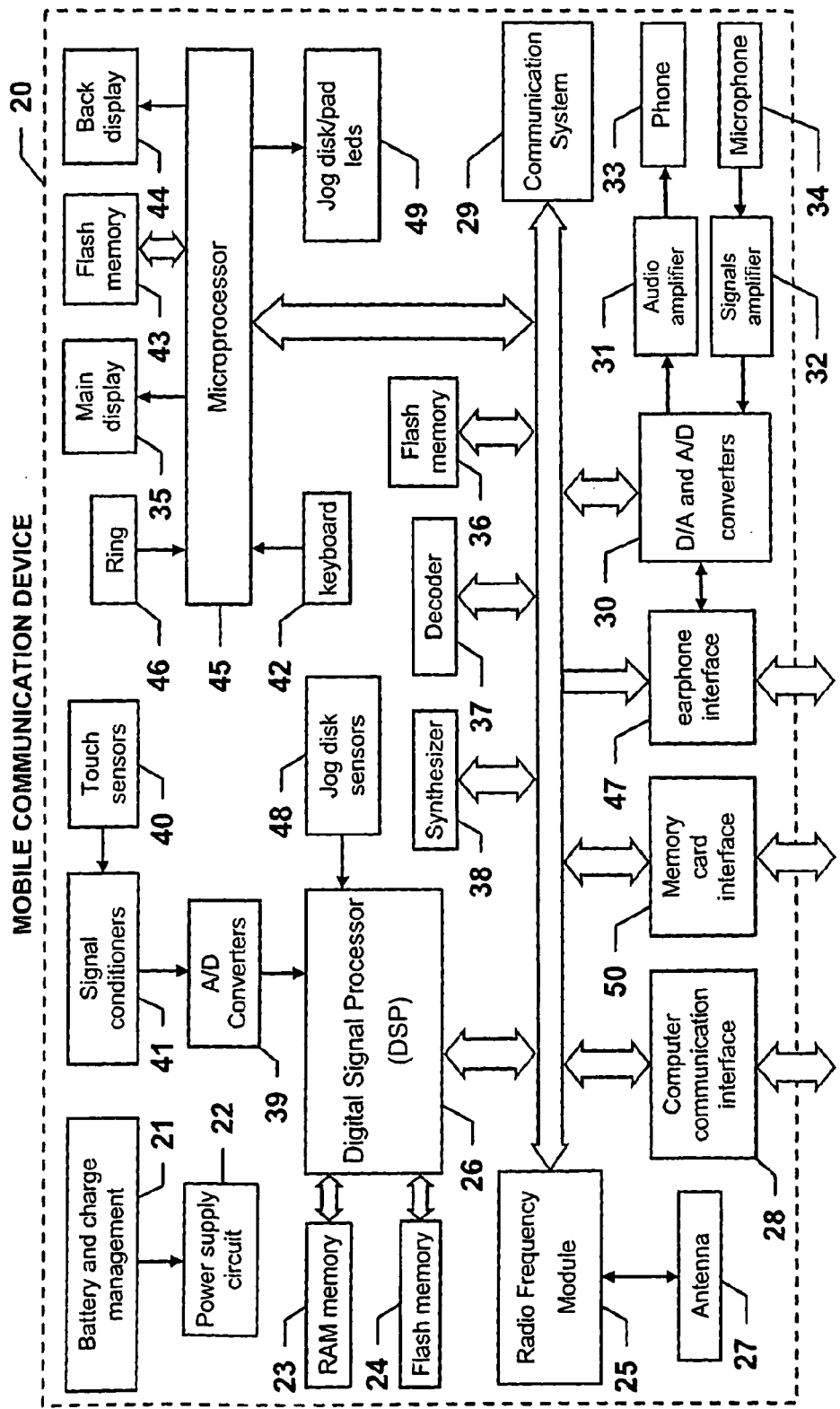
FIG. 3—is a detailed block diagram of the mobile communication device 20, referred to the first preferred embodiment of the device object of the present intention.

FIG. 3 presents a detailed block diagram from the mobile communication device 20, referred to the first and preferred embodiment. This device incorporates a musical instrument, that is, the user can play a musical instrument (percussion, keyboard, string or blow instruments) on the own structure of the device and listen to the resulting sound on the earphones 2 and/or into a home, automotive or portable audio system 6. In this first embodiment, the mobile communication device 20 functions independently from the remote sensor 4, although there is the possibility of its use as being another instrumental interface.

The internal rechargeable battery and the charging management circuit 21 allow the mobile communication device 20 to function independently of external supply sources. The internal battery is associated to the supply circuit 22 that provides regulated voltages to supply the remaining circuits of the device.

The touch sensors 40 are sensitive to frequency and intensity with the purpose of detecting beat/touch, by the hand and/or user's fingers, in different regions of the surface of the pad 135 or the surface of the Jog disk 206. These sensors can be transducers of piezoelectric, capacitive, resistive, inductive, field effect type or also a pressure, strength, displacement, vibration or acceleration sensor. The touch sensors 40 distributed on the surface of the instrument provide different regions that are touch sensitive, in which the user can carry out different functionalities. With this variety of sensors, the user can, for instance, operate on many commands, produce instrument sounds and/or different musical tones, modify parameters or apply different effects, simultaneously or not, to the playing song.

The resultant analog signals from the touch sensors 40 are treated by the signal conditioning circuit 41 and converted into digital words through the analog to digital converters or A/D converters 39. These resulting words are read through the digital signal processor or DSP 26, which obtain the intensity e time/frequency response of the impulse applied to the touch sensors 40. If the touch sensors 40 have a digital interface, the digitalized words obtained are read directly through the DSP 26. The sensors of the Jog disk 48 provide analog or digital signals to the DSP 26, which carries out these signals in order to obtain the information related to the angular position, speed and acceleration applied on the Jog disk 206.

As well as processing the sensors of the mobile communication device 20, the DSP 26 carries out voice signals, sounds, communication indicators, songs, controls communication functions, mix two or more sounds, among other functionalities. This allows the mobile communication device 1, 20, 25 to mix two or more sounds, including these possibilities: mix the sound of a song, modified or not, with musical instruments sounds and/or sound effects; mix the sound of a song, modified or not, with the sound resulting of the adapter 5,56,63,68 or compatible sound system 6; and mix musical instruments sounds or sound effects with the sound resulting of the adapter 5,55,63,68 or compatible sound system 6. Two types of external memory are associated to the DSP 26: —RAM memory 23, which stores temporarily data and information and; —Flash memory 24, which contains the software of the system, called firmware of the subsystem (DSP) and specific information.

The user's voice on a call, for instance, is transduced by the embedded microphone 34, which delivers signals to the amplifier 32 that turns these into digital words through the D/A (digital to analog) and A/D block converters 30. These digital words are related to the user's voice are received and processed trough the DSP 26. In a similar way, the voice of the other user of the call is digitally delivered from the DSP 26 to the D/A and A/D block converters 30, being amplified by the audio amplifier 31 and heard on the phone 33. The voice or the resulting sound can be sent to external wired or wireless earphones 2 through the phone and microphone interface 47, which can be controlled by the DSP 26 and also by the microprocessor 45, in order to activate or deactivate the phones/microphone, to control their volume, among other commands. This interface is also able to receive signals from an external microphone with or without wires. The interface with phone and microphone 47 is able to establish bi-directional communication with the external device, by means of radio frequency, ultrasound, infrared light or electric wires/cables and also it is able to combine two or more of these means of communication.

The communication system 29 provides communication with the remote sensor 4 in order to receive and/or send commands and information. This system is also able to setup wireless communication with a computer 3, home, automotive or portable audio systems 6, wireless access point, internet or with any other compatible equipment. The communication system 29 is also able to send/receive analog or digital audio and/or video signals to/from any compatible device or equipment. In addition, the communication system 29 is compatible with the adapter 5, which allows a non-compatible equipment to receive audio and/or video signals from de mobile communication system 1,20,55. This system, which interacts and is controlled by the DSP 26, also might send/receive digitalized commands. This communication system 29 is able to communicate in directional and bi-directional way, meaning that the communication can be achieved by radio frequency, ultrasound or infrared light, as well as an association of two or more of these means of communication.

The radio frequency module 25 has a client configuration on a wireless network 7 for data and voice, which can be a cellular type. This module can be compatible with any other mobile communication device, on its whole functionality, including the AMPS (Advanced Mobile Phone System), TDMA (Time Division Multiple Access), CDMA (Code Division Multiple Access), W-CDMA (Wideband Code Division Multiple Access), GSM (Global System for Mobile Communications) or 3G (Third Generation Mobile) standards, or even compatible with wireless (Wi-Fi) networks. The internal or external antenna 27 allows the reception or transmission of radio frequency through the communication mean, being compatible with the module 25.

The internal Flash memory 36 of the mobile device is used to store files or data of internal applications (games, schedule, tools, etc.), musical instrument sounds, songs, data and any files. The internal Flash memory 36 is able to be expanded through an inserted memory card. For that matter, the interface with memory card 50 is accessed and controlled by the DSP 26 as well as by the microprocessor 45. The mobile communication device 1,20,55 can play songs, stored in the Flash memory 36 or in a memory card, related to mp3, wma, ogg, wav or any other digital format. The audio files having any kind of compression or codification are carried out through the decoder 37. The musical instrument sounds (percussion, keyboards, string or blow) are produced by the synthesizer 38, which performs the reading of instrument standards in files stored in the Flash memory 36 or in a memory card. Another advantage of the present device is that it is able to mix musical instrument sounds with the music sound, by means of the DSP 26.

The computer communication interface 28 allows the mobile communication device 20,55 to setup communication with any computer, only if the computer comprises a similar installed interface and suitable software, screening on the device as a physical interface that uses electric wires/cables. Therefore the computer communication interface 28 provides a standard and universal mean to connect any computer by means of a cable. Through this communication interface it is possible, for instance, to control a computer program in order to produce musical instrument sounds (percussion, keyboards, string or blow), from the commands sent by the mobile communication device 20,55. Another possibility includes sending files from the computer 3 to the Flash memory 36 or copying files from this memory to the computer 3, also operating as a computer data storage memory.

The microprocessor 45 has several functionalities, such as: read and process keyboard 42 data, send digital information to the back display 44 and main display 35, activate the ring 46 when necessary, support and execute applications, as well as perform the control of the entire device. The DSP 26 also functions in combination with the microprocessor 45, receiving orders and commands, as well as exchanging information. The firmware or embedded software, which is intended to carry out determined actions by means of the microprocessor 45, is stored in the Flash memory 36, which can also store personal and/or specific information.

The pad/Jog disk leds 49 are light emitter diodes which are distributed equally under the surface of the pad 135 or Jog disk 206, according to the device modality, and are controlled by the microprocessor 45. The purpose of these leds is to provide luminous indication to the user related to the action that must be taken, that is, to inform to the user about the position of the disk that must be touched, as well as the moment and intensity of the particular touch.

Figure 4:
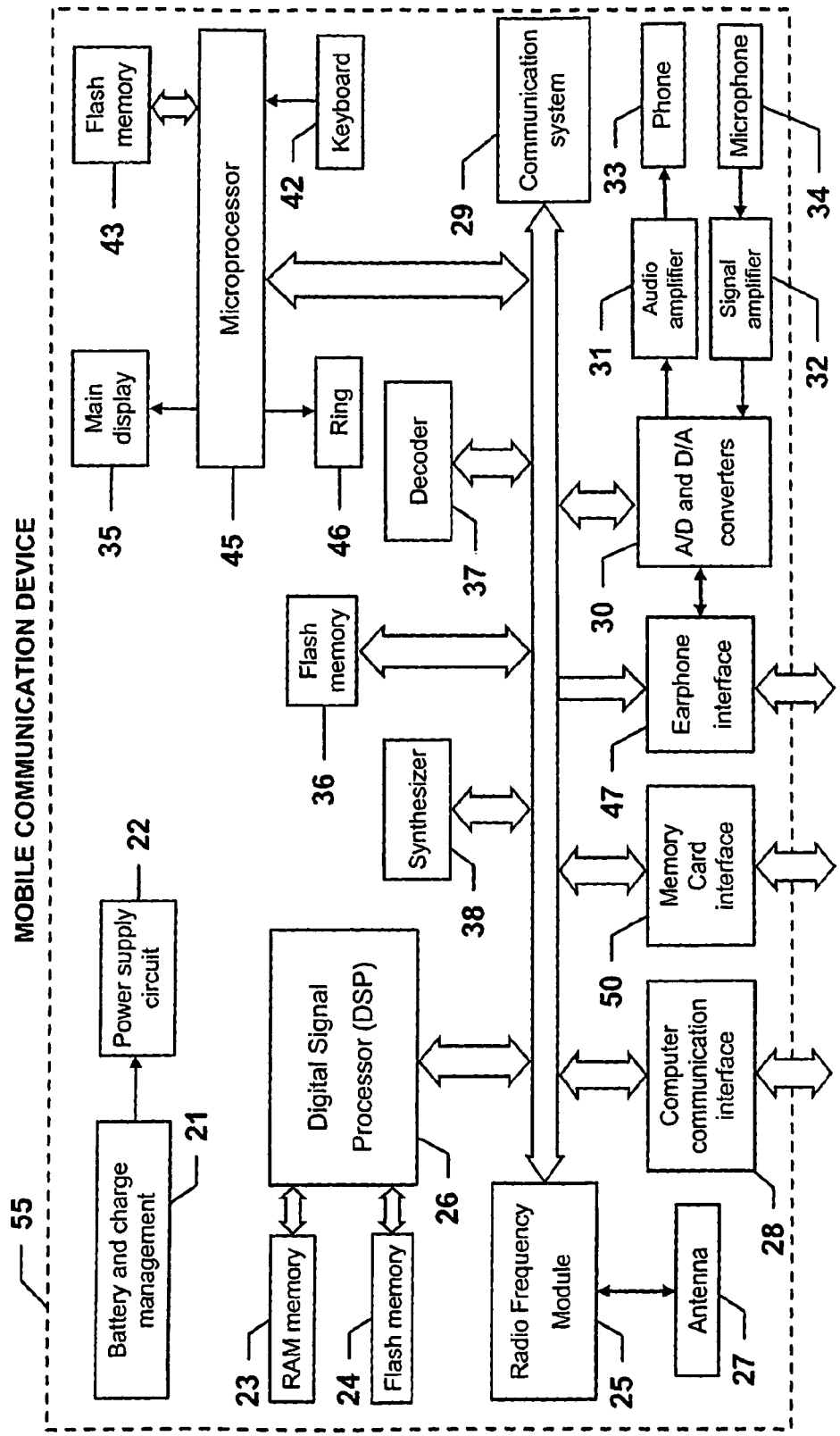
FIG. 4—is a detailed block diagram of the mobile communication device 55, in reference to the second embodiment of the device object of the present invention.

The blocks diagram of FIG. 4 presents the mobile communication device 55 referred to the second embodiment of the device object of the present invention. It is important to point out that this device does not have a musical instrument interface associated, being essential the use of the remote sensor 4 in order to extend the same functionalities carried out by the mobile communication device of the first embodiment 20. In this second embodiment, the device receives, through the communication system 29, digitalized signals related to the stimulus applied on the touch sensors 40 and on the Jog disk sensors 48 belonging to the remote sensor 4,70,75. The blocks shown in the diagram of FIG. 4 will not be detailed as they present the equivalent functionalities and characteristics of the ones described in diagram of the FIG. 3.

Figure 5:
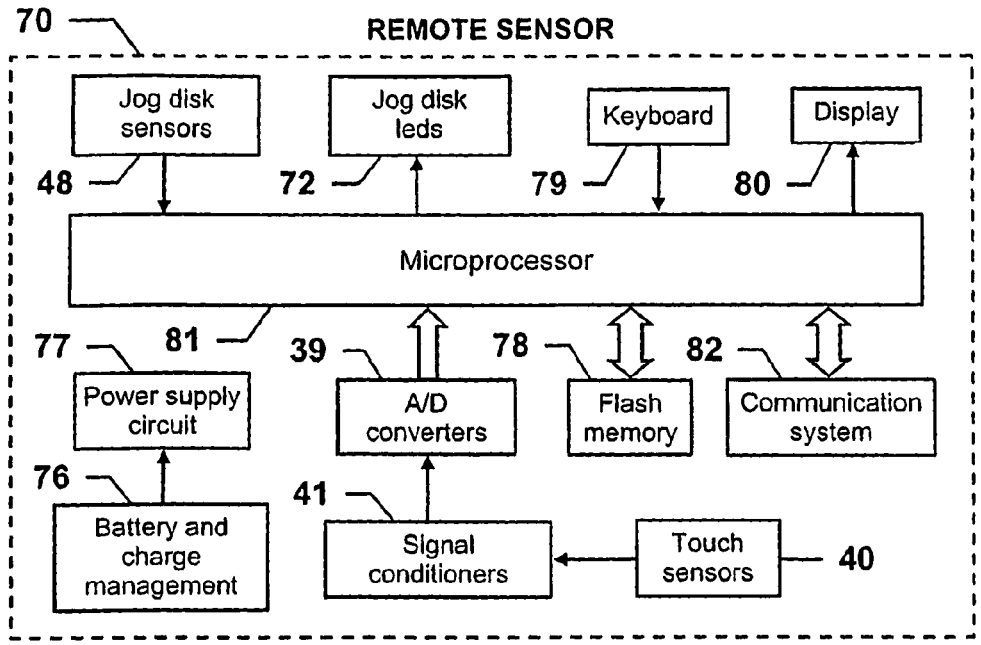
FIG. 5—is a detailed block diagram of the remote sensor 70, in reference to the second embodiment of the device object of the present invention.

The second modality of the remote sensor 4 is further detailed due to the block diagram of FIG. 5. This device comprises an internal rechargeable battery and charge managing circuit 76 which, by means of the supply circuit 77, provides the suitable power for the remaining circuits. The touch sensors 40 are the same as the ones described for the mobile communication device of the first embodiment 20, providing analog signals that are treated through the signal conditioners 41 and converted to digital words by the AND converters 39. The microprocessor 81 carries out the data of the touch sensors 40 and the Jog disk sensors 48, resulting commands and new data that are sent, by means of the communication system 82, to the mobile communication device 55. In case the sensors 40 have digital outputs, where the signals are treated and digitalized, these sensors might send the resulting data directly to the microprocessor 45.

The communication system 82 is identical and compatible with the system of the mobile communication device 29, allowing data transfer in a bi-directional way (two-way) and in the same communication mean defined for the communication system 29. This system sends the commands and controls performed by used to the mobile communication device 20,55, and receives various information from this system, such as: type of the selected instrument, name of the song, command to light up the leds 72, evaluation response, among other useful information to the user. The microprocessor 81 also reads and carries out the keyboard 79 data and commands the display 80, which also function as an extension of the main display of the mobile communication device 35. The Flash memory 78, associated to the microprocessor 81, stores the firmware that controls the entire device, as well as stores data, applications, routines, etc.

Figure 6:
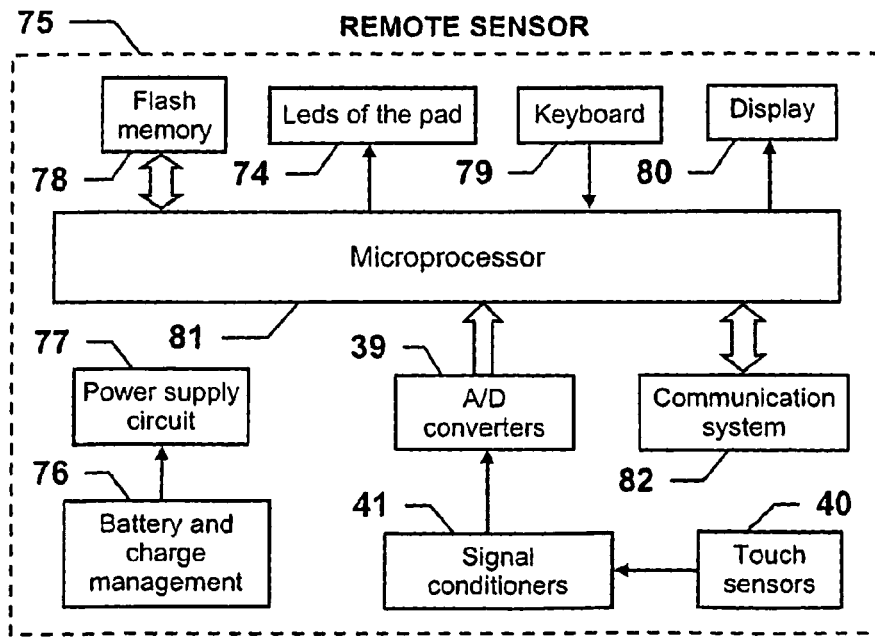
FIG. 6—is a block diagram of the remote sensor 75, in reference to the second embodiment of the device object of the present invention.

FIG. 6 presents the block diagram of the first modality of the remote sensor 75. The blocks and the function of this modality are similar to the second modality already described, except for the fact that the Jog disk sensors 48 are not present anymore and that the leds 74 and touch sensors 40 are now directly related to the first modality of the remote sensor 75. This diagram is also applicable to describe the third 275, fourth 392 and fifth modality 412 of the remote sensor 4.

Figure 7:
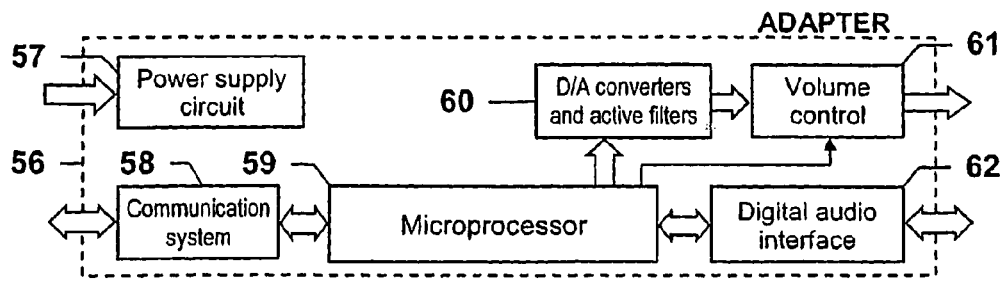
FIG. 7—is a block diagram of the first modality of the adapter 56, in reference to the first and second embodiments of the device object of the present invention.

FIG. 7 presents a block diagram of the first modality of the adapter 56, which can act on the mobile communication device of the first and second embodiment 20,55. An external power supply connected to the adapter 56 delivers energy to the supply circuit 57, which provides regulated voltages to the remaining circuits. This communication system 58 is identical and compatible with the communication system of the device 29, establishing communication allowing digital data in a bi-directional way between these equipments.

The resulting sound of the mobile communication device 20,55 is sent to the adapter 56, which decodes the received data, by means of the microprocessor 59. The processed data passes through the D/A converters and active filters 60, recomposing the analog signal related to the resultant sound. This signal is adjusted in amplitude through the volume control circuit 61, controlled by the microprocessor 59. Therefore, the amplitude adjusted signal is available into standard audio channels in order to enter any audio and/or video equipment. The digital audio interface 62 is compatible with any audio and/or video equipment, besides being another digitalized audio output, it can also act as a digital audio input that is able to send the input is audio to the mobile communication device 20,55.

Figure 8:
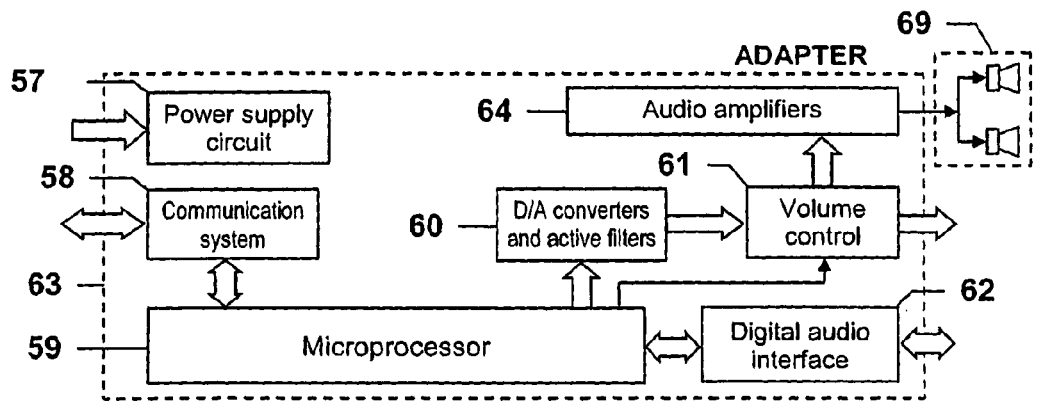
FIG. 8—is a block diagram of the second modality of the adapter 63, in reference to the first and second embodiments of the device object of the present invention.

FIG. 8 shows the block diagram of the second modality of the adapter 63, acting on the mobile communication device of the first and second embodiment 20,55. This adapter is identical to the adapter of the first modality 56, except for including audio power amplifiers 64 in order to drive the loudspeakers 69.

The adapter 63 can be used to provide sounds or videos, created or played on the mobile communication device 20,55, to a equipment that is not compatible with the communication system 29. This adapter can be installed on the automotive audio system, connected in audio inputs, that is able to drive the vehicle's loudspeakers. Another option is to use the second modality adapter 63 to directly drive, for instance, the loudspeakers of an automobile. An audio and/or video signal of an equipment, in which the adapter 56,63,68 is connected, can also be sent to the mobile communication device 20,55.

Figure 9:
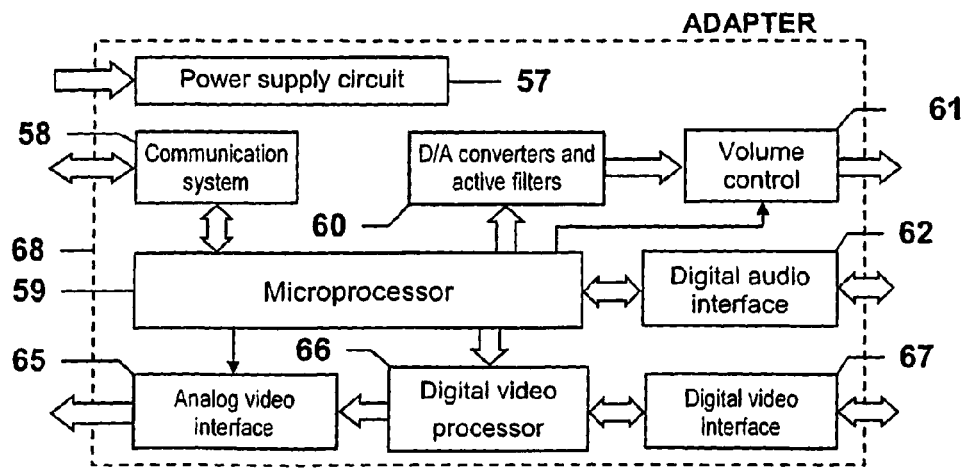
FIG. 9—is a block diagram of the third modality of the adapter 68, in reference to the first and second embodiments of the device object of the present invention.

The block diagram of the third modality of the adapter 68, which is also able to act on the mobile communication device of the first and second embodiment 20,55, is shown on FIG. 9. This adapter incorporates the circuits and functionalities of the first modality of the adapter 56, including means to provide an analog or digital video signal. To this purpose, the mobile communication device 20,55 sends data and/or commands, in reference to characters, points, figures, images or photos to the adapter 68, by means of the communication system 58. These data and/or commands are decode and pre-processed by the microprocessor 59, which sends the resulting data to the digital video processor 66. This processor is responsible for the image formation, sending it to video digital interface 67 and/or to the analog video interface 65, which respectively provide digital and analog video signals. These video signals that leave the adapter 68 are compatible with the existing video standards, providing images for a TV or projector.

The mobile communication device of both embodiments 20,55 is able to evaluate the user's performance in the accompaniment of a song with a musical instrument or basically his skills to compose a song or a melody. The reference parameters considered in the accompaniment evaluation are: synchronism/rhythm, intensity, selected instrument and musical note. From the song file, or independent file, that contains the standards, in reference to the evaluated parameters, and considered as reference, is possible to calculate the resulting score or grade related to the user's performance on the acting of playing the instrument. In the case the user prefers to play a melody, without the accompaniment of a song, it is possible to provide the evaluation as well. To accomplish this the musical style is selected, for instance, rock, jazz, samba, etc. considering that the standards are recorded in files stored in the Flash memory 36, and are compared to the parameters obtained, such as: intensity, rhythm/synchronism and musical note, as well as check the selected instrument, including the musical creativity factor, which considers situations that the user can make use of different instruments and even instruments difficult to play in determined song or music style, acquiring additional weight according to the level of difficulty of the used instrument and the selected style. In the mobile communication device of the second embodiment 55, the evaluation result is shown on its display 35 and also on the remote sensor display 80.

A difficulty level, which has the function to establish a certain rigor on the user's performance evaluation, can be chosen. The possible ones are divided into four levels: beginner with help, easy, medium and difficult. To such end, the evaluation parameters receive different weights and different standards are selected according to the defined level.

The mobile communication device 20,55 allows the resulting sound, from the song with musical instrument accompaniment or only instrumental sounds, be recorded in the Flash memory 36 or in a memory card. One of the ideas of the present invention consists of sending the sounds or the melodies produced by means of audio-message. The user is able to attribute the produced sounds or melodies as ring tones, in order to indicate the various activities of the device. Then, the musical interface available on the mobile communication device 20 or in the remote sensor 4,70,75 becomes a simple and efficient tool to create polyphonic tones (ring tones). These sounds can also be sent to a home, automotive or portable sound system 6, as well as to a computer 3, which is able to play and/or edit them.

The production of instrumental sounds (percussion, keyboards, string or blow) can be made of different ways, besides the use of the instrumental interface associated to the mobile communication device 20 or to the remote sensor 4,70,75. These instrumental production means comprise the act of clapping hands, finger cracks, sounds emitted trough the user's lips, tap dance, among other possible manners. These emitted sounds by the user are acquired by the microphone 34 and interpreted. On the instrumental sounds production, the intensity, tone, frequency and duration of the user's emitted sound are considered and converted to the corresponding selected musical instrument. With this, is possible to discharge the use of the remote sensor 4,70,75 or the musical interface of the device. The user performance evaluation is also possible on this functioning mode, once the musical style is selected; then, the standard parameters of synchronism/rhythm, intensity and musical notes are evaluated. The musical tone is defined through the sound produced by the user.

Figure 10:
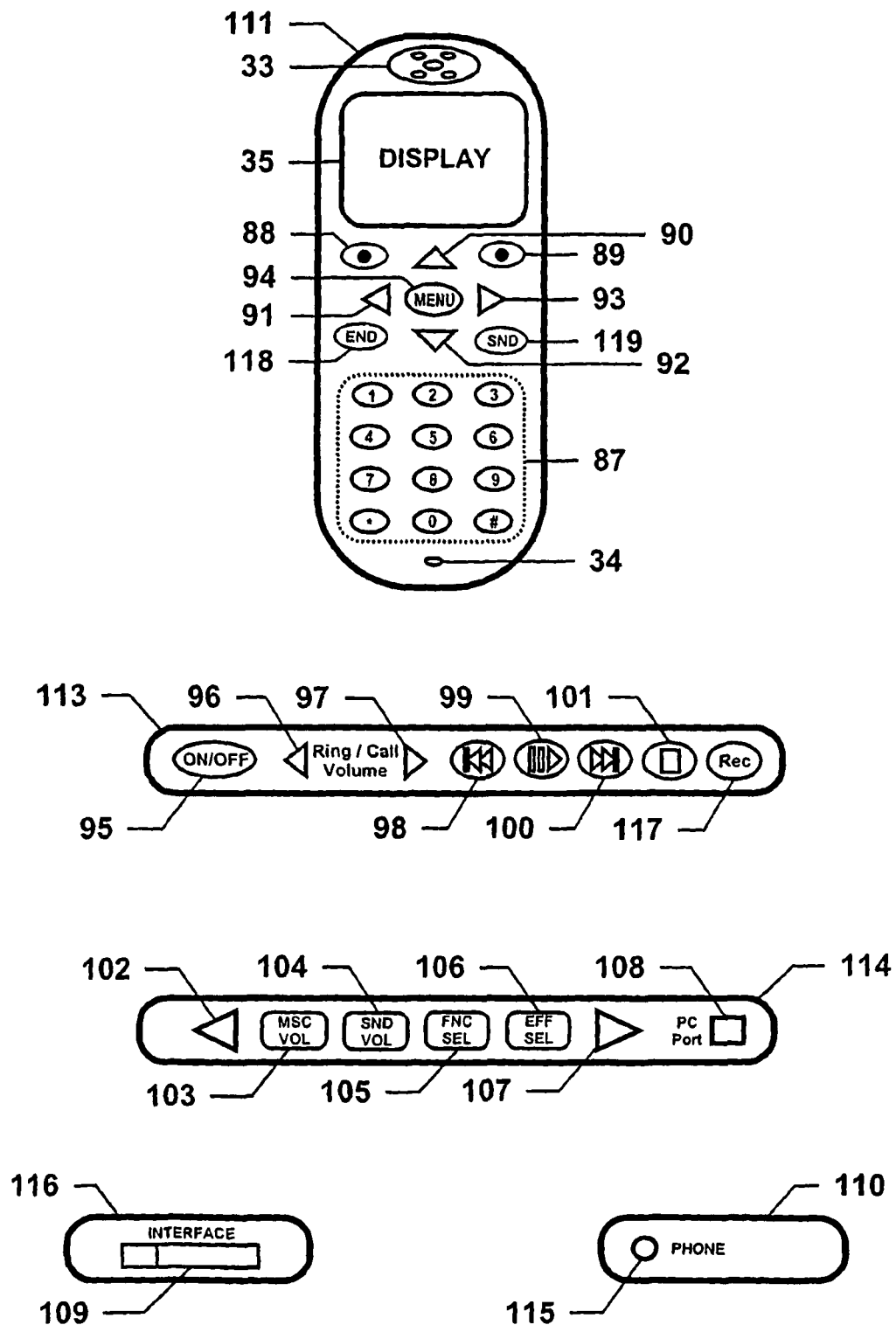
FIG. 10—views of the front side 111, left side 113, right side 114, lower side 116 and upper side 110 of the first modality of the mobile communication device, in reference to the second embodiment of the device object of the present invention.

FIG. 10 shows the front side view 111, left side 113, right side 114, lower side 116 and upper side 110 from the mobile communication device of the first modality and referred to the second embodiment 55.

On the front view 111 there are entrances for the internal phone 33, a graphic display 35, two buttons for select the menu 89,88, a menu and sub-menu access key defined by MENU 94, browsing keys 92,91,93,90, the END key 18 used to finish a call or cancel a function, the SEND key 119 used to establish a call, a numerical keyboard 87 and an entrance for the internal microphone 34.

The left side view 113 presents an extension of the keyboard of the device, comprising special functions. The ON/OFF key 95 turn the device on or off, while the Ring/Call Volume keys 96,97 adjust the ring and call volumes. The Fast Rewind/Previous Music 98, Play/Pause 99, Fast Forward/Next Music 100 and Stop keys 101 control the song, melody or sound playing. The Rec key 117 allows the recording of the produced sound, or the sound produced and mixed to a song.

The right side view 114 presents the remaining of the keyboard and the PC port 108, which is related to the computer communication interface 28. The MSC VOL key 103 allows the song volume to be adjusted and the SND VOL key 104 acts in the sound volume adjust, being necessary the used of arrow keys 107,102, which allow to increase or decrease the adjust, or also, move a selection forward or backward. The EFF SEL key 106 selects the sound effects to be produced on the musical instrument in question, such as: echo, pitch, move the playing forward or backward, add some noises or various distortions, among other effects. Finally, the FNC SEL key 105 provides function access to the user, such as: instrument selection, audio adjusts, equalizer, among others that can be chosen through the arrows 102,107.

The interface 109 showed on the lower side 116 is the input to the battery charger and input/output to others accessories that are not part of the present invention. On the upper side 110 there is a connector to wired earphones and microphone 115.

Figure 11:
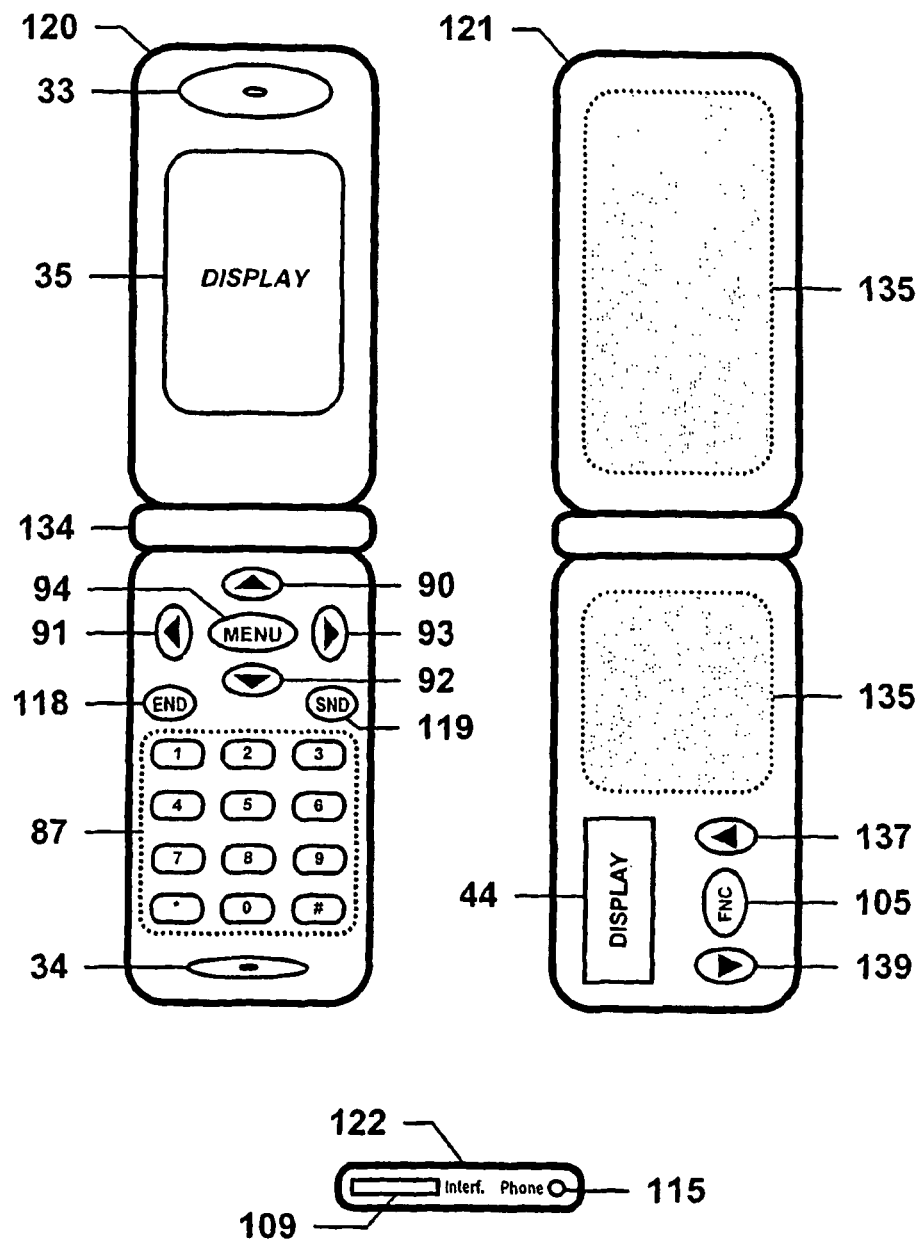
FIG. 11—views of the front side 120, back side 121 and lower side 122 of the second modality of the mobile communication device, in reference to the first embodiment of the device object of the present invention.

FIG. 11 shows the frontal 120, back 121 and lower side views 122 of the mobile communication device, referred to the second modality and belonging to the first embodiment of the object of the present invention. The associated physical instrument is similar to an electronic drum.

The mobile communication device 120 is formed by two parts that can be closed or opened through joints 134. On the upper side there is the phone 33 and the main graphic display 35. On the lower half part there is a menu key 94, browsing keys 92,91,93,90, call control keys 118,129, numerical keyboard 87 and microphone 34.

The back side 121 has surfaces 135 sensitive to the user's hand/fingers touch or beat, also called pad, allowing the user to produce musical instruments sounds (percussion, keyboards, string or blow) by beating, pressing or touching these surfaces. Each surface can represent a different instrument with different tones, providing a grate variety of options to the user.

The back display 44 provide visual information to the user, such as the name of the selected or playing song, selected musical instrument, menus, sub-menus, configurations, audio adjusts, score or performance level, among other information. The FNC key 105 give access to options, configurations, adjusts, menus and other useful functions, while the arrow keys 139,137 assist in the selection.

Figure 12:
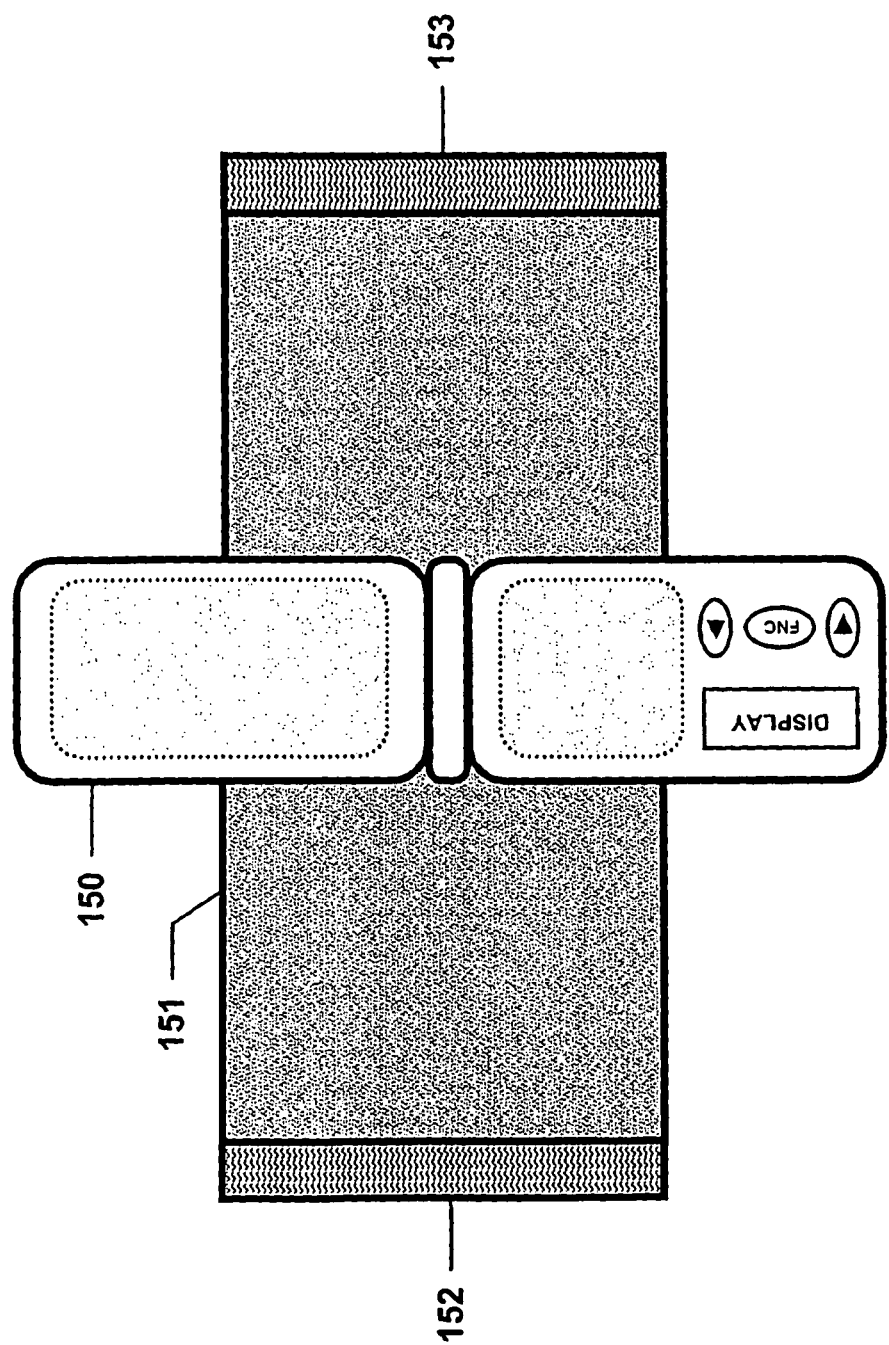
FIG. 12—view of the back side of the second modality of the mobile communication device 150, which is attached to an adjustable elastic belt 151, being objects of the present invention.

FIG. 12 shows the second modality of the mobile communication device 150, attached to an adjustable elastic belt 151, which contains Velcro straps or adhesive portions 153,152, preferably allowing the adjust and installation of the device 150 onto the user's body.

Figure 13:
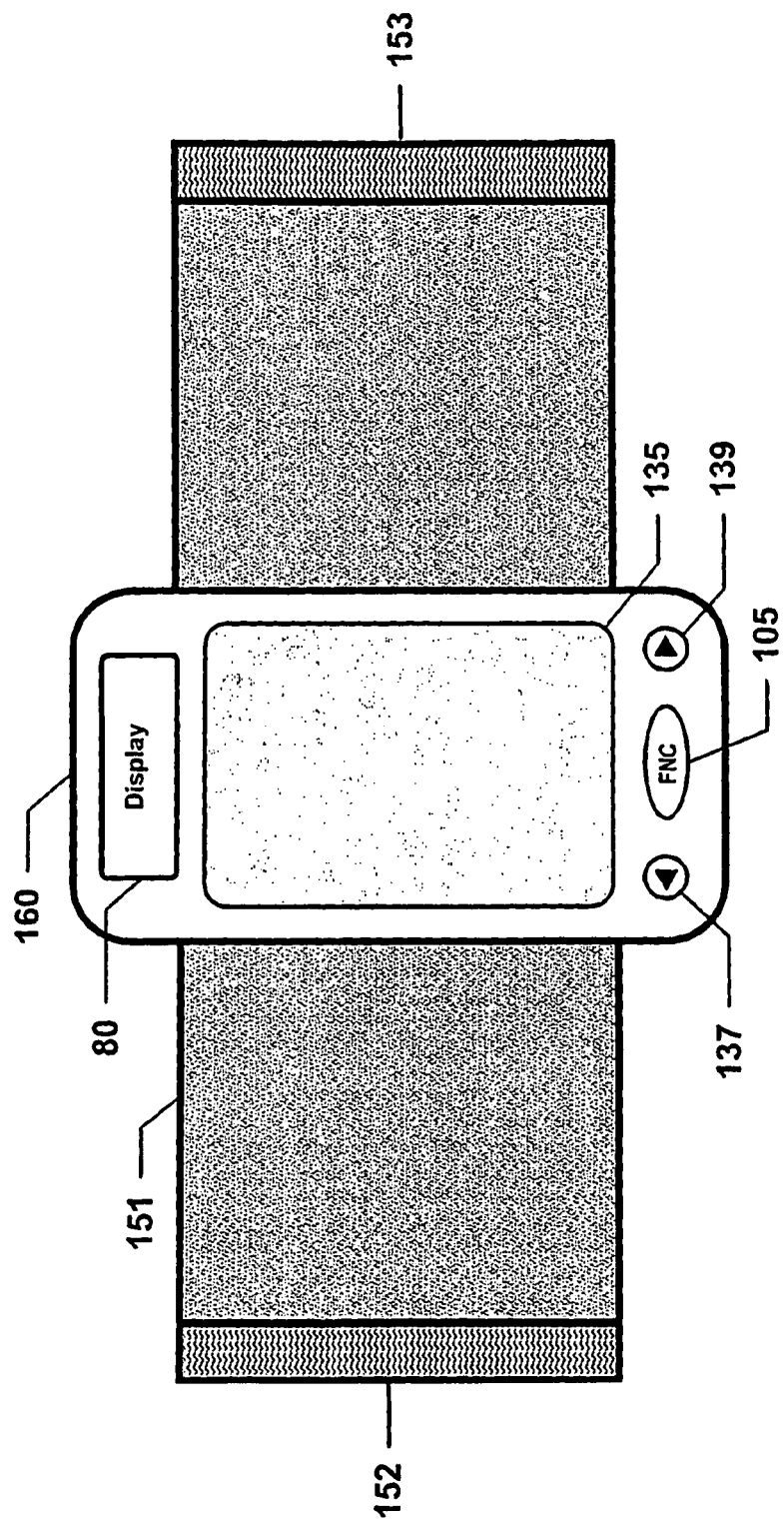
FIG. 13—is a front view of the first modality of the remote sensor 160, which is attached on its adjustable elastic belt 151, in reference to the second embodiment of the device object of the present invention.

FIG. 13 presents a frontal view of the first modality of the remote sensor 160, which accompanies the mobile communication device 55 and, with the adapter 5, forms the second embodiment of the device object of the present invention. The remote sensor 160 is attached onto an adjustable elastic belt 151, which contain Velcro straps or adhesive portions 153, 152. On the front side of the device there is a display 80, a touch sensitive surface or pad 135 where the user can produce musical instruments sounds (percussion, keyboards, string, blow) when the user beats or touches the pad 135, the FNC key 105 already described and the browsing arrows 139,137.

Figure 14:
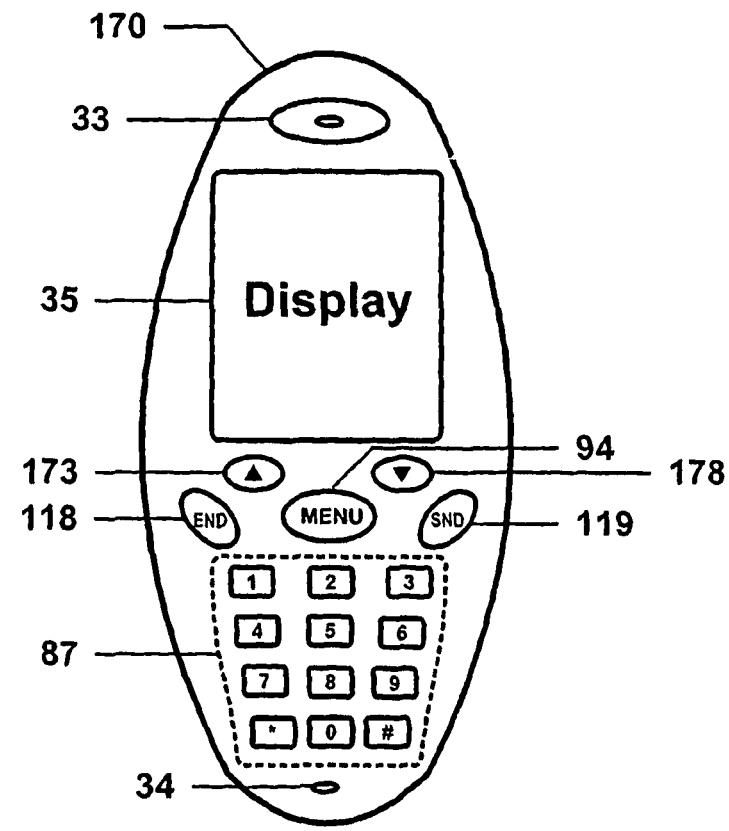
FIG. 14—views of the front side 170, right side 192 and left side 185 of the third modality of the mobile communication device, in reference to the first embodiment of the device object of the present invention.
Figure 14:
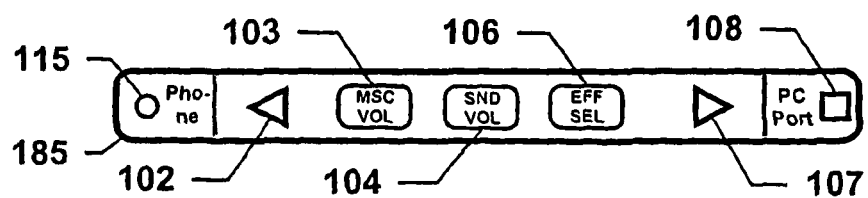
Figure 14:
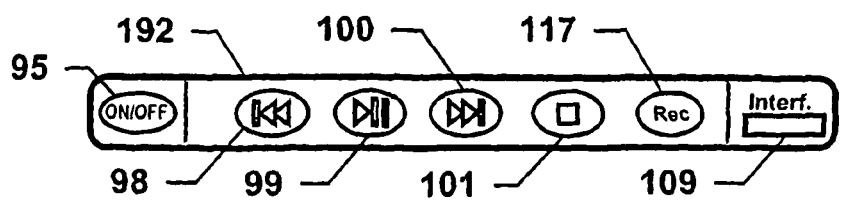

FIG. 14 shows the front side 170, right side 192 and left side 185 of the mobile communication device of the third modality, which represents a Jockey Disk device or an electronic DJ. With this communication device modality the user can act as a DJ (Disk Jockey), that is, the user can apply sound effects, control reproduction parameters, among other characteristics, like the audio professionals that perform as DJ's.

On the front side 170, there is the phone 33, the graphic display 35, the selections keys 178,173, the call keys 118,119, the MENU key 94, numerical keyboard 87 and microphone 34. By the frontal keys, the user can perform phone calls; send text and audio messages, access configurations, use applications, select a musical instrument, play a song, among other musical possibilities, all that with the support of the display 35 visualizations.

On the left side 185 there is a wired phone and microphone connector 115 and a PC port 108, which is associated to the computer communication interface 28. There are also available the volume selection keys, SND VOL 104 and MSC VOL 103, the effects key EFF SEL 106 and the browsing arrows 107,102. The right side 192 comprises an interface connector 109 that allows the battery charge and connection with accessories, the ON/OFF key 95 and playing control keys 100,98, 99,101. The play/pause key 99 initiates the sound or music playing, if pressed again, the key will state the playing in a pause mode. The fast rewind/previous music key 98 backwards the playing or turn playing the previous sound or song, as long as the fast forward/next music key 100 advances the playing or skips to the next song of the playing list. The playing is canceled through the stop key 101, while the Rec key 117 allows the recording of the produced sounds or resulting sound.

Figure 15:
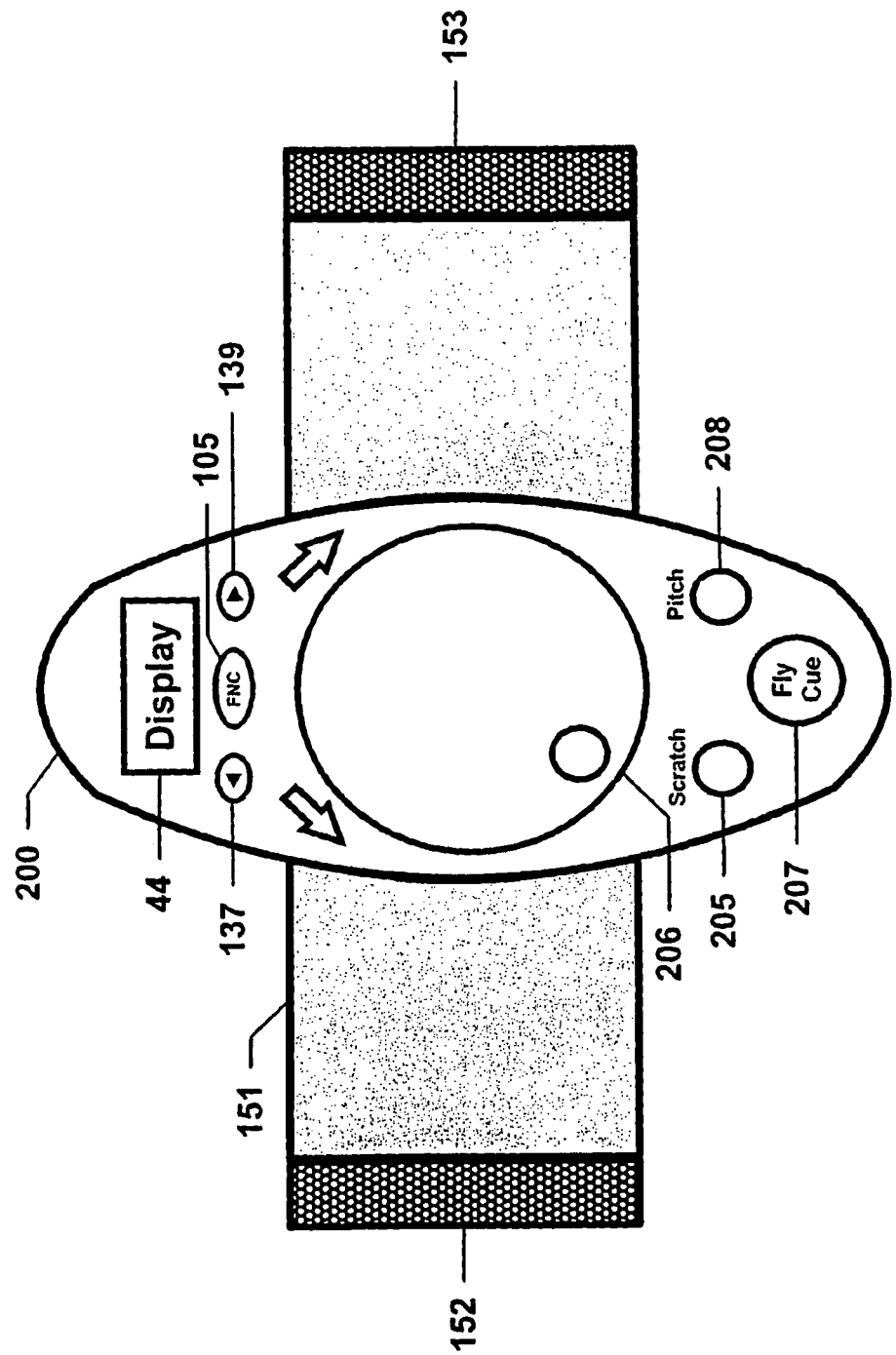
FIG. 15—view of the back side of the third modality of the mobile communication device 200, which is attached to the adjustable elastic belt 151, in reference to the first embodiment of the device object of the present invention.

FIG. 15 shows the back side of the mobile communication device 200, referred to the third modality, which can be attached onto the adjustable elastic belt 151 which has Velcro straps or adhesive portions 152,153. The back side of the device 200 has the main commands of the musical instrument in question, which seems to be a turntable, though there are only useful controls and commands to the user performs like a DJ.

The graphic display 44 is able to show the name of the song, the playing list number referred to the selected song, playing time elapsed, total time of the song, beats per minute or BPM, selected function, menus and other important details for visualization. The FNC key 105 and the browsing keys 137,139 in order to the user looks through and selects the menu options, as well as modify the type of the musical instrument, select audio special effects, in addition to other important functionalities. The Scratch key 205 stops the song and allows the user to control the playing, who uses the Jog disk 206, which will be described next. The Pitch key 208 selects the playing velocity control, being done through the Jog disk 206. The Fly cue key 207, when pressed, can mark a point on the playing song so that it can be played again right to this point, when the user requests.

The Jog disk 206 it's a spinning disc, on which the user makes use of his hands and/or fingers to spin it, so that it can increase or decrease one of the song selected parameter. This disc acts on the production of musical instruments sounds (percussion, keyboards, string and blow), sound effects, allows to alter a song or sound playing parameters, can be used to assist in the menu browsing, acts on the control of the applications and it is also touch sensitive as the pad 135.

The Jog disk 206 is compounded with a rubber material, rubber, silicone, rubber with silicone, that is, a cushioned and resistant material. By spinning the disk clockwise the parameter value will increase, while anticlockwise will decrease the same parameter. For instance, if the selected playing parameter is intended to forward or backward the playing (scratch function), spinning the Jog disk 206 on clockwise direction will play the song progressively according to the advance on this direction. The same will happen on the anticlockwise however, playing will go backwards. The Jog disk 206 is also sensitive to the user's hand and/or fingers touch/beat, acting in a selected function or even producing musical instruments sounds (percussion, keyboards, string or blow), which can be mixed to the playing music sound. The Jog disk 206 comprises spin sensors 48 that are able to detect the disc position, angular speed and/or angular position, and comprising an angular speed sensor, angular position, acceleration or movement sensor. Besides that, there are touch sensors 40 below its surface in order to detect touches/beats.

The pad 135 and also the Jog disk 206 have several touch sensors associated to regions or points under its surface, as well as leds distributed under the surface in order to indicate functionalities, functions, commands and to aid the improvement of the use of the device. In the case of the pad 135, to simulate the spinning of Jog disk 206, the user must slide or drag his hand and/or fingers over the pad 135. The speed, movement direction and intensity are detected, through the plurality of sensors spread, and converted in rotation direction and equivalent speed for the Jog disk 206.

Several leds are arranged under the surface of the Jog disk 206 and pad 135. The lighted up region or point correspond to the touch point and its luminous intensity, which is controllable, is related to the strength or pressure to be applied on the surface. The combination of these leds also provides luminous indication in the shape of arrows, circles, squares and other geometric shapes, in addition to figures and symbols to indicate functionalities, functions, commands the leds are also intended to improve the use of the device. An example of the leds action 49,72,74 consists on a future action of the type "spin the Jog disk 206 clockwise at maximum intensity". So, the group of leds is arranged in arrow form should light up in a sequence in reference to the rotation and the intensity will inform the velocity to be applied. Therefore, the user notices the rotation's direction and how fast he should rotate, observing how fast the arrow formation appears and its luminous intensity.

Its is important to point out that the Jog disk 206 and pad 135 surfaces are compounded with a soft, rubber or cushioned material, which is semitransparent or transparent to light, allowing the luminosity of the leds, placed under the surface, to be properly seen by the user. Another reason for the Jog disk 206 and pad 135 to be soft is to prevent hand and/or fingers injury due to repetitive touches/impacts.

Figure 16:
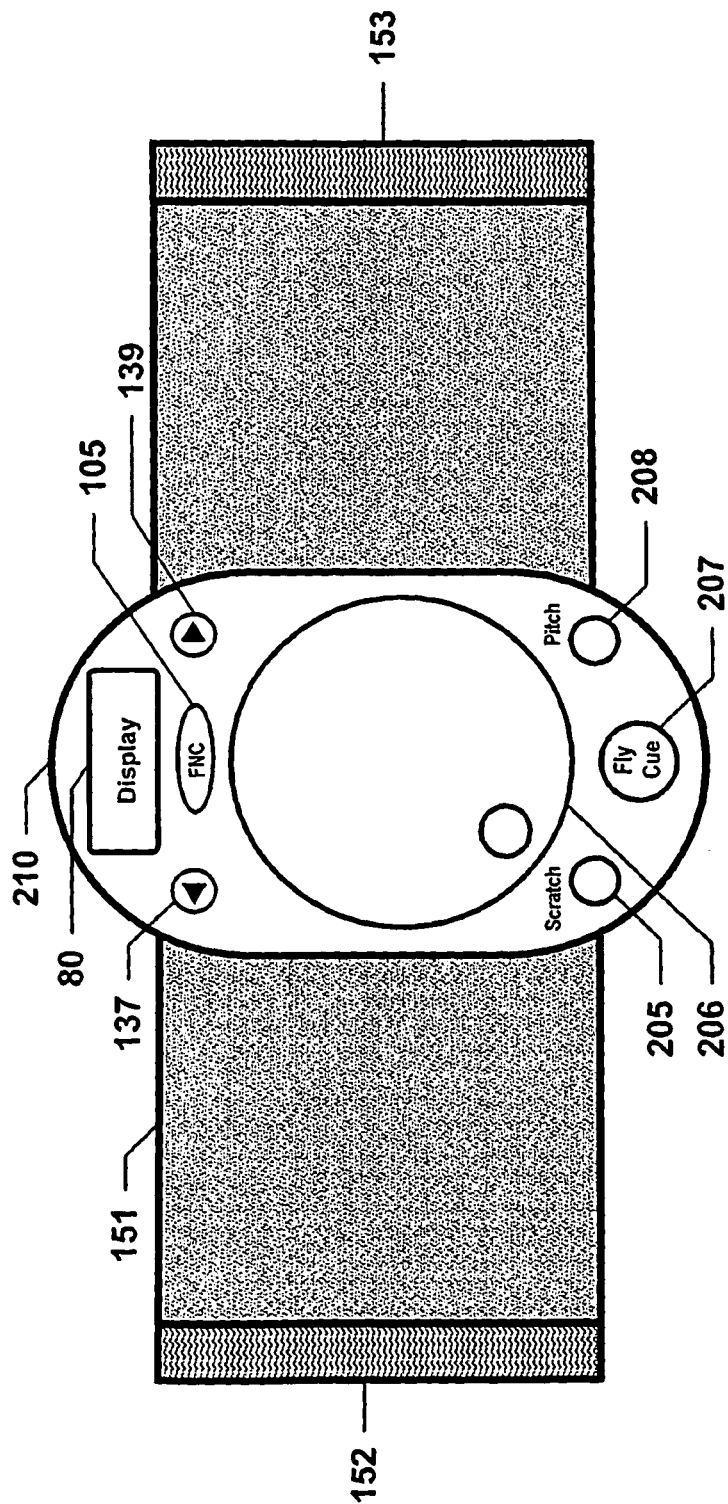
FIG. 16—is a front view of the second modality of the remote sensor 210, which is fixed to the adjustable elastic belt 151, in reference to the second embodiment of the device object of the present invention.

FIG. 16 shows a front side view of the first modality of the remote sensor of the second modality 210, which is strapped by an adjustable elastic belt 151 with Velcro straps or adhesive portions 152,153. This sensor holds controls and commands with the purpose to modify a song parameter, used by audio professionals or DJ's. The remote sensor of this modality 210 intends to complete the mobile communication device referred to the second embodiment, making this combination to carry out and fulfill the same functionalities of the third modality of the mobile communication device 200.

The front side of the remote sensor 210 has a graphic display 80 which presents visual information, such as name of the song, playing list number referred to the selected song, playing time elapsed, total time of the song, beats per minute or BPM, selected function, menus and other important details for visualization. Besides the Jog disk 206, the remote sensor has the FNC 105 key, browsing arrows 137,139, Scratch 205, Pitch 208 and Fly cue keys 207.

Figure 17:
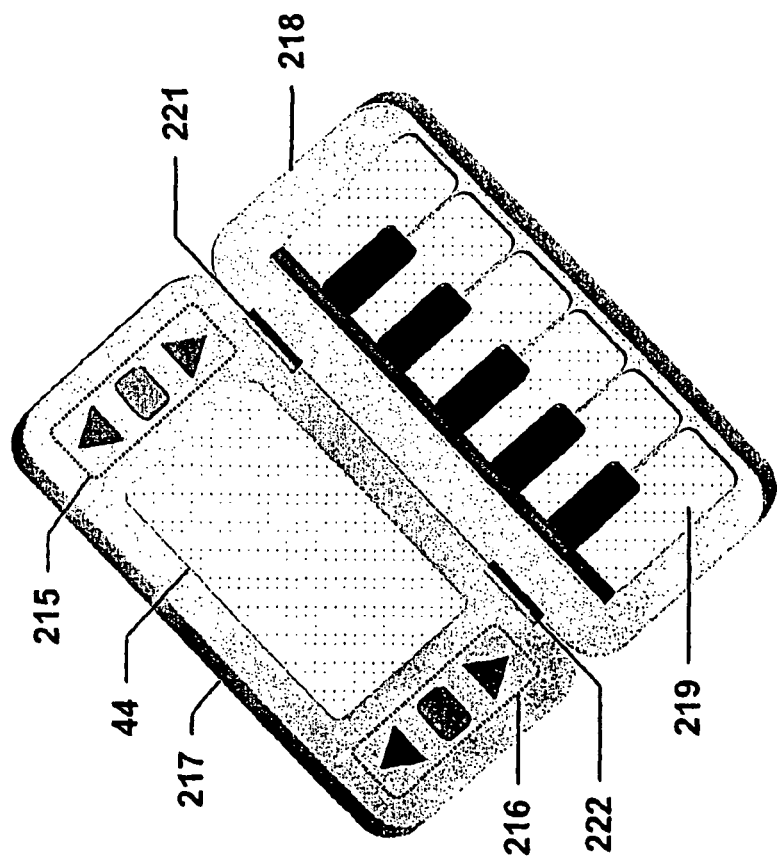
FIG. 17—is a spatial view of the fourth modality of the mobile communication device 217, in reference to the first embodiment of the device object of the present invention.

The fourth modality of the mobile communication device 218, in reference to the second embodiment, is shown on FIG. 17. This modality presents an instrumental interface of the piano type, which is found on the center of the device 218, when opened. Both parts of the device 217,218 open itself by means of joints 221,222, allowing the access to the internal display 44, function, menus and browsing keys 215,216, as well as the piano keyboard 219. Under each piano key there are touch sensors 40 and leds 49 distributed in manner of detect the intensity, time and frequency of the touch applied by the user. The produced sounds are not limited to piano sounds; it also can be sounds of the most varied percussion, keyboards, string or blow instruments.

Figure 18:
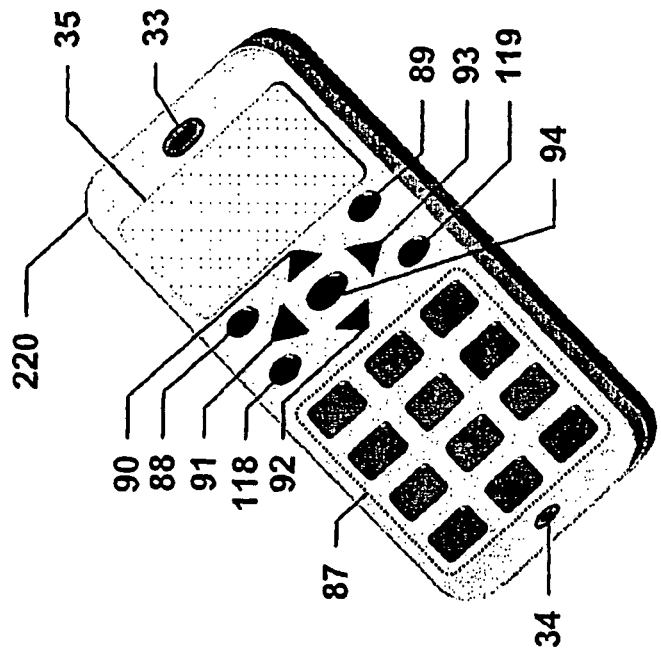
FIG. 18—is a spatial view of the fourth modality of the mobile communication device 220, in reference to the first embodiment of the device object of the present invention.

FIG. 18 shows the fourth modality of the mobile communication device 220, where both parts 218,217 are found closed. The visual of this device is similar to the device of the first modality 111, having, on the frontal side, the selection keys 89,88, menu and browsing keys 89,88,94,9291,9390, call control keys 118,119, numerical keyboard 87, frontal graphic display 35, phone 33 and microphone 34. The right, left, lower and upper sides are similar to the device of the first modality 114,113,116,110.

Figure 19:
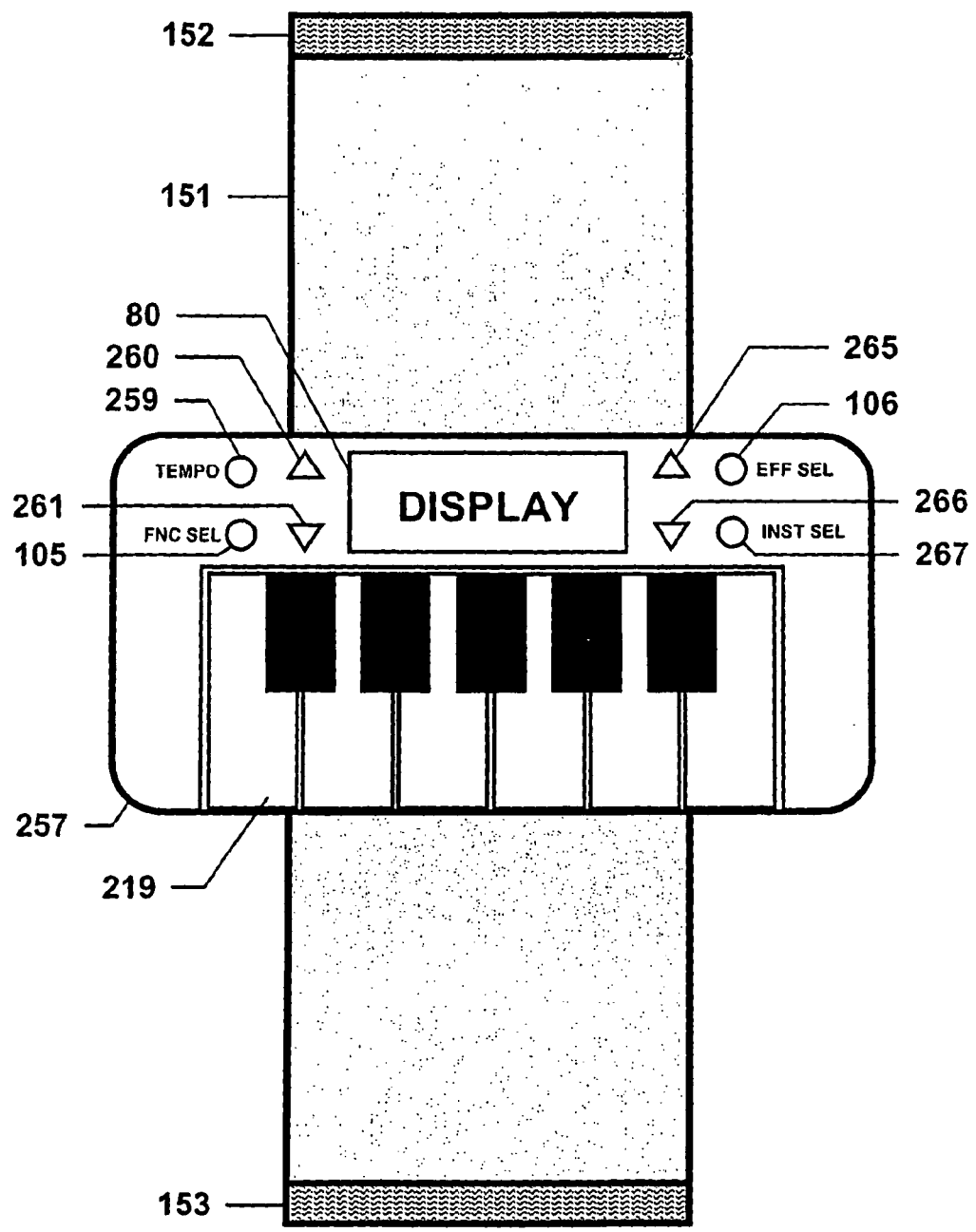
FIG. 19—is a front view of the third modality of the remote sensor 257, which is attached to the adjustable elastic belt 151, in reference to the second embodiment of the device object of the present invention.

The third modality of the remote sensor 257 is shown on FIG. 19, which can be attached onto an adjustable elastic belt 151 having Velcro straps or adhesive portions 152,153. The musical interface of this sensor is similar to a piano, and this remote sensor modality 257, along with the first modality of the mobile communication device 111 act in a similar way to the fourth modality of the device 220. On the front side of the device there is a graphic display 80, a piano keyboard 219 and the EFF SEL 106, INST SEL 267, TEMPO 259 and FNC keys 105. The INST SEL key 267 makes the selection of musical instruments by means of browsing keys 266,265. The TEMPO key 259 has the function of changing the sound or melody playing speed, by just using the browsing keys 261, 260 in order to act on this parameter.

Figure 20:
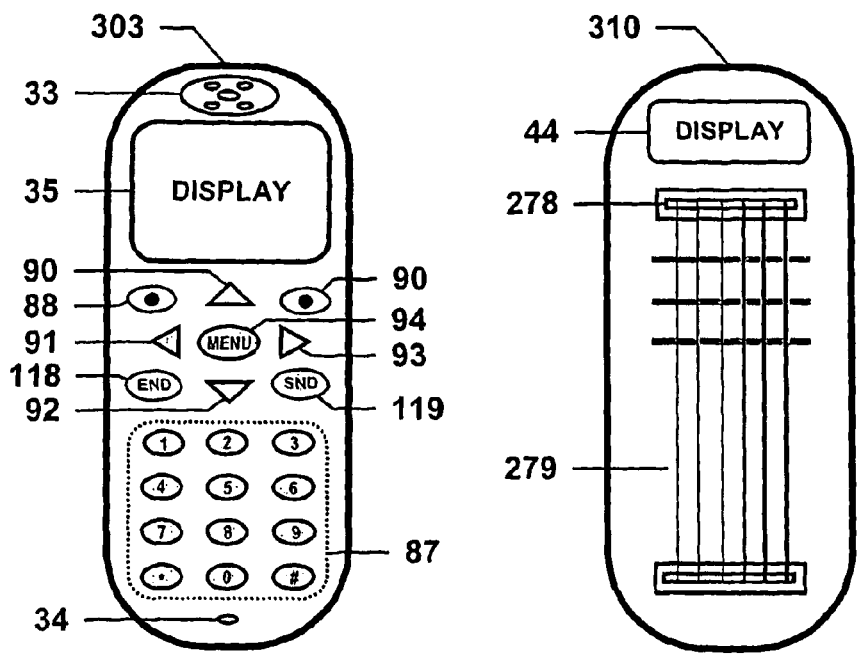
FIG. 20—views of the front side 303 and back side 310 of the fifth modality of the mobile communication device, in reference to the first embodiment of the device object of the present invention.

FIG. 20 shows the front side 303 and back side views 310 of the fifth modality of the mobile communication device, comprising another possibility to form the electronic device object of the first embodiment of the present invention. The main instrument associated to the device is able to assume a guitar or a violin function, though sounds of other musical instruments (percussion, keyboards, string or blow) can be also produced by means of the strings 279.

The front side 303 is identical to the one of the first modality of the device 11, as well as the lateral sides. The difference is on the back side 310 that has a string musical instrument and the back display 44. The string sensors 278 assume the touch sensors 40 position shown on the block diagram of the FIG. 3.

The strings 279 have individual sensors 278 on its extremities, which transduce the vibrations produced by the strings into electrical signals. These vibrations are sensed, processed and musical instrument sounds are produced from the selected instrument or sound/musical effect. These sensors 278 can be of piezoelectric, capacitive, inductive or resistive type, or they can also be a vibration, movement, displacement and/or acceleration sensor. Besides that, the musical strings 279 are suitable to each type of instrument and has mechanic properties similar to the strings used on professional musical instruments, which can be made of metal, plastic, nylon or a combination of these materials.

It is important to consider that the Jog disk 206, pad 135, strings 279, piano keys 219 and sensitive regions 363,364, 366,365,362, comprise at least one sensor that can be of piezoelectric, capacitive, inductive or resistive type, or can also be a vibration, movement, displacement and/or acceleration sensor. The Jog disk 206, pad 135, sensitive semi-glove 370 and sensitive glove 360 comprise more than one touch sensitive region or point, once they are able to detect touch points or regions, as well as to detect movements, intensity and the frequency/duration of a touch over its surfaces. The Jog disk 206, as well as the pad 135, is able to act on applications, commands, menus, selections and other control functions.

Figure 21:
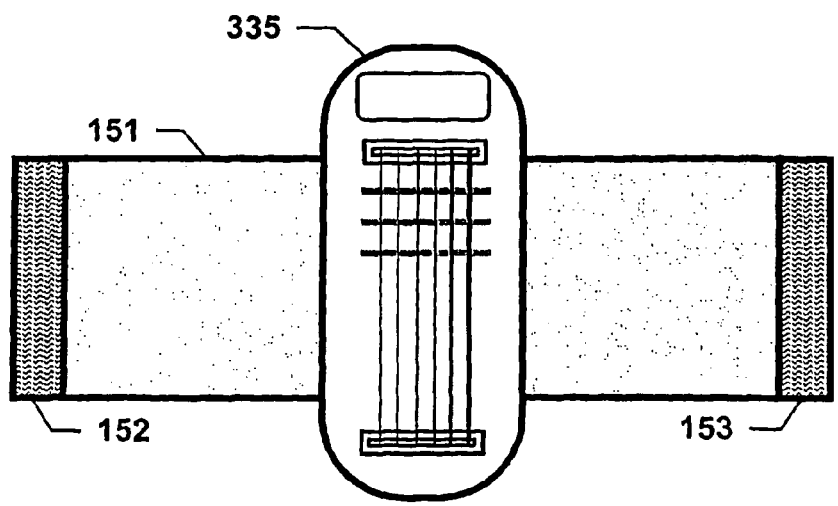
FIG. 21—is a back view of the fifth modality of the mobile communication device 335, which is attached to the adjustable elastic belt 151, in reference to the first embodiment of the device object of the present invention.

FIG. 21 shows the front view of the fifth modality of the mobile communication device 335, in reference to the first embodiment, which is attached onto an adjustable elastic belt 151, with Velcro straps or adhesive portions 152,153.

Figure 22:
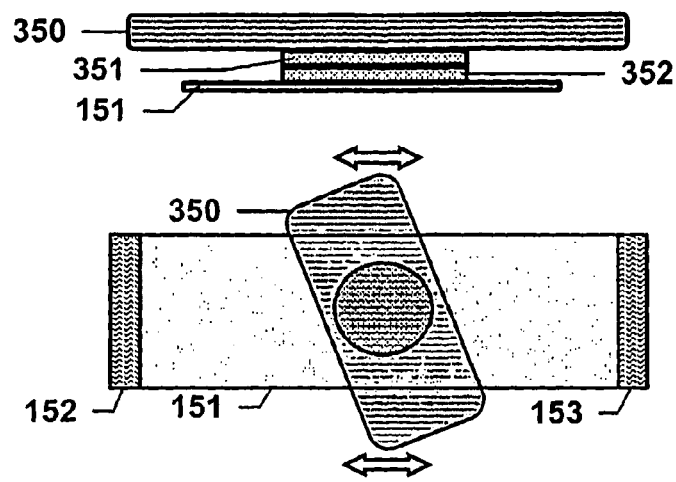
FIG. 22—is a lateral upper view of the first possible arrangement between the body of the device 350 and the adjustable elastic belt 151.

One of the ways to attach the body of the mobile communication device or the remote sensor 350, in all modalities and in both embodiments, is presented on FIG. 22. According to the side view, there are two discs 352,351, which are fastened and one slide among the other, joining the body of the device or sensor 350 to the adjustable elastic belt 151. It is important to observe that the belt 151 and the body 350 have efficient means to connect the discs 352,351. Therefore, it is possible to spin the body of the device (remote sensor or mobile communication device) around the belt 151.

Figure 23:
FIG. 23—is a lateral view of the second possible arrangement between the body of the device 350 and the adjustable elastic belt 151.
Figure 24:
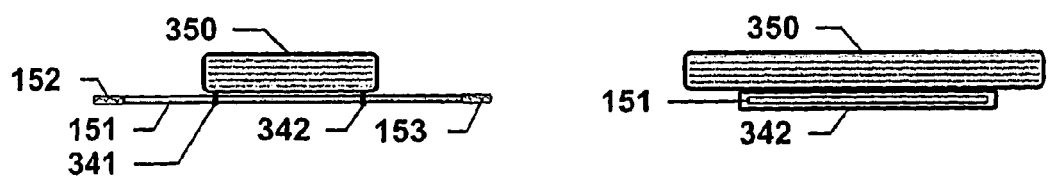
FIG. 24—lateral views of the third arrangement that illustrates one of the manners to attach the body of the mobile communication device or remote sensor 350 onto the adjustable elastic belt 151.
Figure 25:
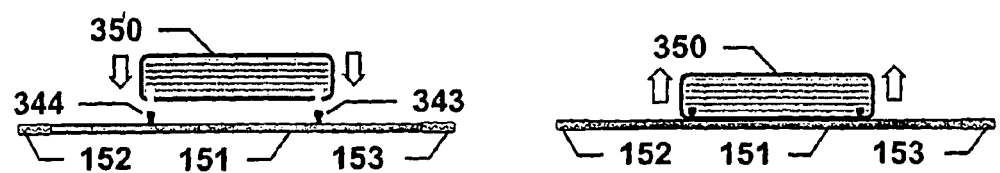
FIG. 25—lateral views of the fourth arrangement which involves attachment clips in order to attach the body of the device 350 onto the adjustable elastic belt 151.

Another way to attach the body of the device 350 consists on the use of adhesive portions or Velcro 340 attached onto the belt 151 and onto the body of the device 350, as shown on FIG. 23. FIG. 24 suggests that the adjustable elastic belt 151 passes through two rigid supports 341,342 attached onto the body of the device 350, similar to a watch. FIG. 25 presents the belt 151 with pins 344,343 which attach or clip to the body device 350. In the last case, the pins 344,343 and the attaching system on the body of the device 350 must provide efficient and practical means to connect the device 350 on the belt 151, as well as provide an easy and uncomplicated mean to remove the device 350. In general, there is a mechanism to attach the body of the device 350 on the elastic belt 151, which is efficient, practical and uncomplicated, that can comprise discs 352,351, adhesive portions or Velcro 340, supports 341, 342, attachment pins or clips 344,343, press studs buttons, among other available attachment mechanisms.

Figure 26:
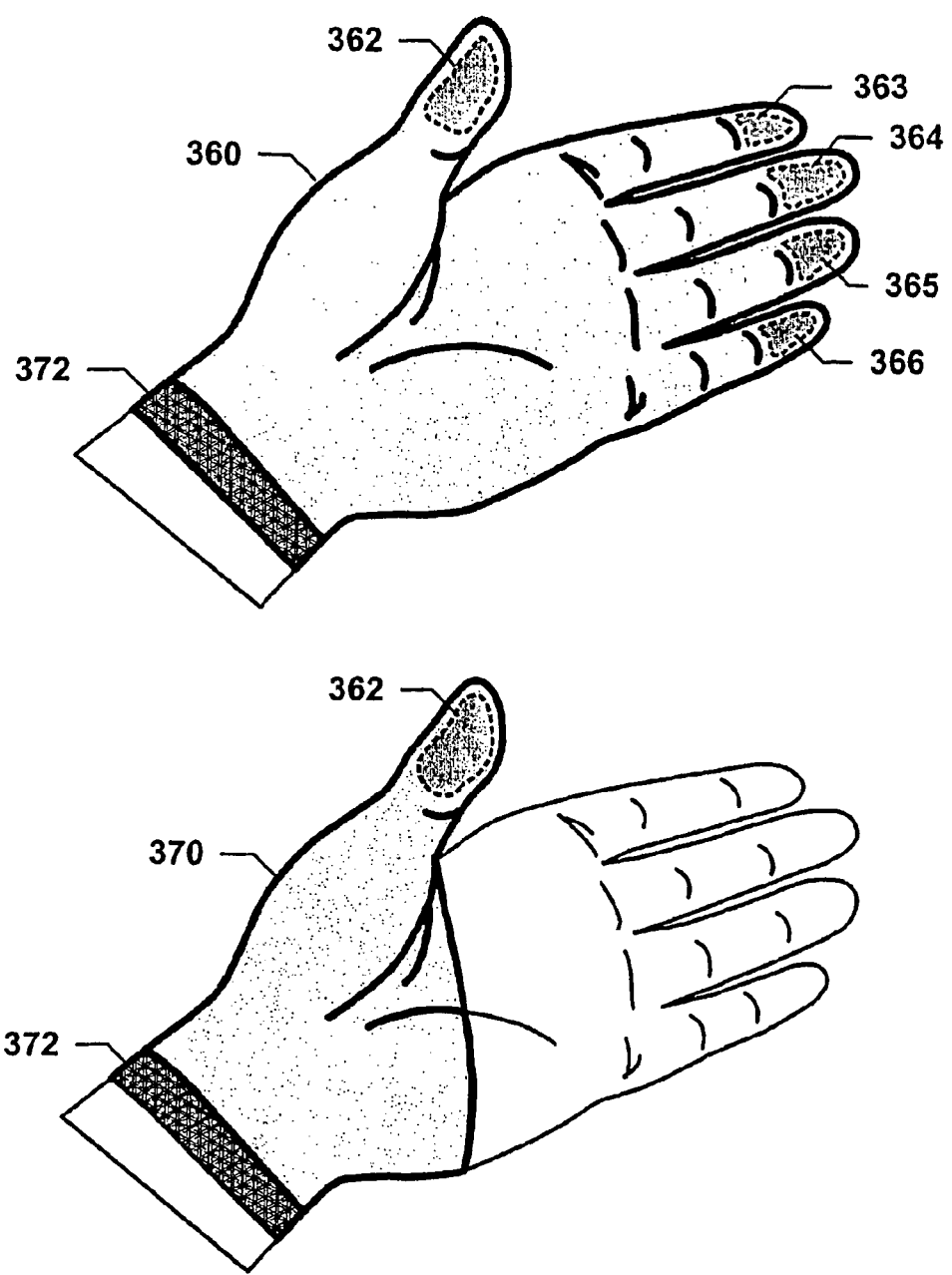
FIG. 26—is a spatial view of the sensitive glove 360 and the sensitive semi-glove 370, which are part of the fourth and fifth modality of the remote sensor 392,412, in reference to the second embodiment of the device object of the present invention.

A more practical and easy way to create musical instrument sounds (percussion, keyboards, string or blow) is to put the touch sensors 40 of the remote sensor 75,70 on the top of the user's fingers. FIG. 26 presents a sensitive glove 360, as the view of the internal part or palm of the hand, which covers the user's hand and having an elastic belt 372, considering that the touch/beat sensitive regions are available on the fingers surface 363,364,366,365,362. Another type of sensitive semi-glove 370, as the view of the internal or palm of the hand, which covers a region of the user's hand and has an elastic belt 372, where only the thumb has a touch sensitive region 362. The touch sensors 363,364,366,365,362 of both types of gloves 360,370 can be of piezoelectric, capacitive, inductive or resistive type, and can also have a pressure, strength or displacement sensors. In addition to the sensors, the glove modalities 360,370 can have leds 74 or luminous points, being placed on the touch sensitive region or on its opposite part (above the nails).

Figure 27:
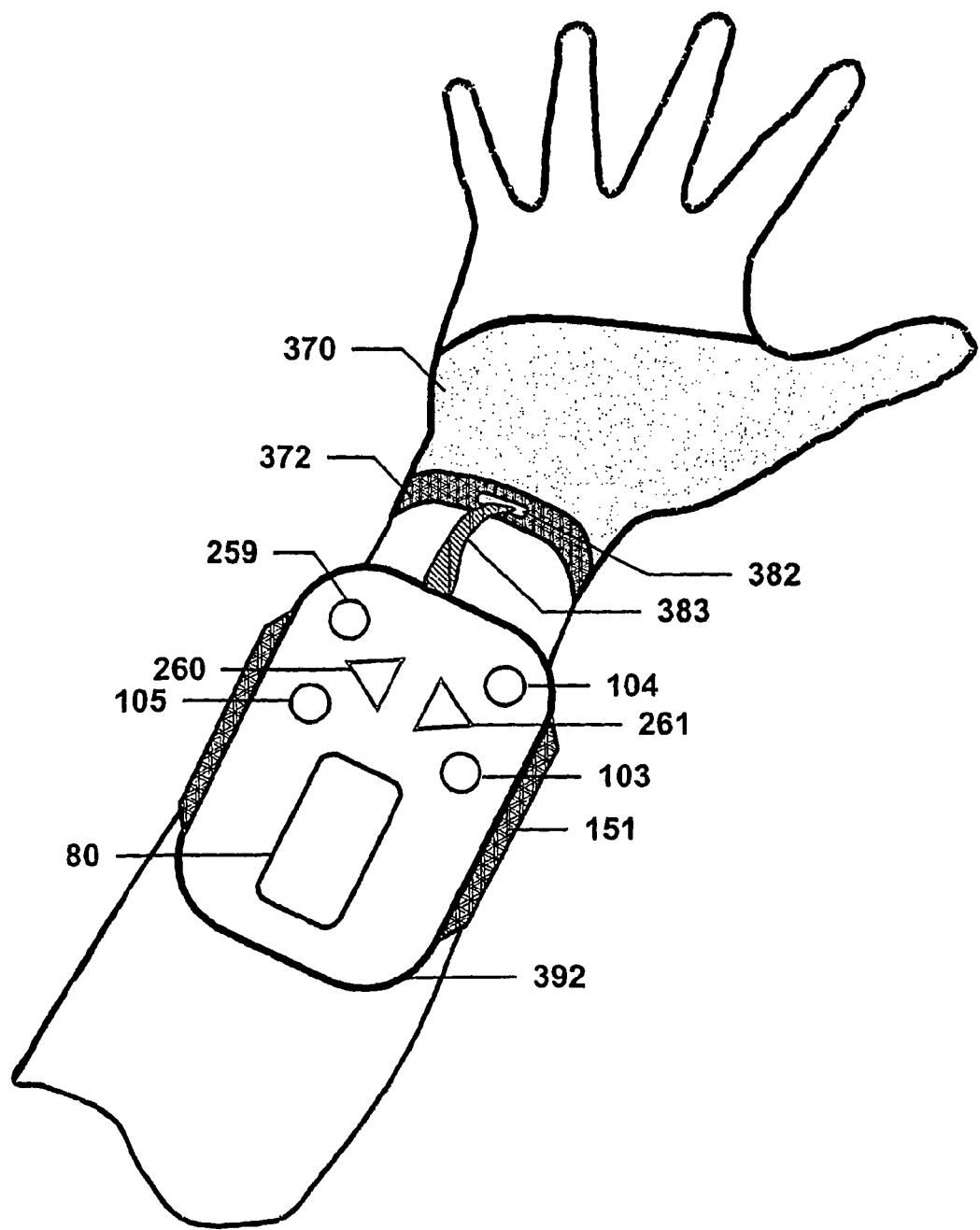
FIG. 27—is a spatial view of the fourth modality of the remote sensor 392, in reference to the second embodiment of the device object of the present invention.

The fourth modality of the remote sensor 392, which includes a sensitive semi-glove 370, is shown in FIG. 27. On this modality the body of the remote sensor 392 can be strapped on the user's arm through an adjustable elastic belt 151. The sensitive semi-glove 370 has an opening 382 on its belt 372, where the wires 383 come out from the sensors and go to the remote sensor 392. On the front side of the remote sensor is located the graphic display 80, the FNC 105, MSC VOL 103, SND VOL 104, TEMPO keys 259 and the arrow shaped keys 260,261 that allows to modify the selected parameters through the other keys.

Figure 28:
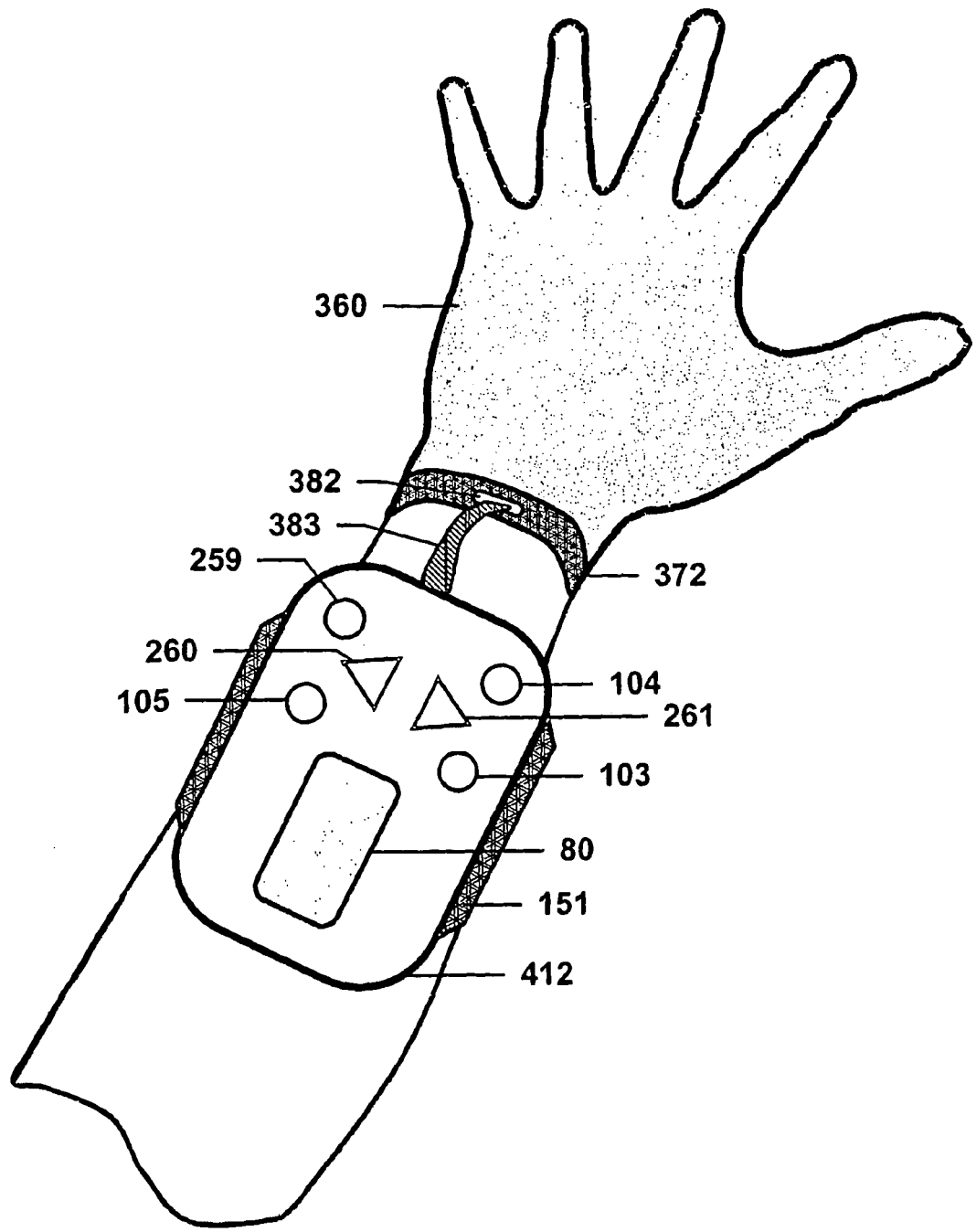
FIG. 28—is a spatial view of the fifth modality of the remote sensor 412, in reference to the second embodiment of the device object of the present invention.

FIG. 28 shows the fifth and last modality of the remote sensor 412, which comprises the sensitive glove 360. The body of the remote sensor 412 can be strapped or fastened onto the user's arm through an adjustable elastic belt 151. The sensitive glove 370 has an entrance 382 where the wires 383 come out to deliver the sensors signals to the remote sensor box 412. On the front side of the remote sensor is located the graphic display 80, the FNC 105, MSC VOL 103, SND VOL 104, TEMPO keys 259 and the arrow shaped keys 260,261.

All the communication devices 11,150,200,220,335, remote sensors 160,210,257,392,412 and adapters 56,63,68 of the present invention, in all modalities, are involved by metallic and/or plastic boxes. Outside the box or the structure of the device there are visible keys, connectors, visors and holes. Inside the box there is a printed circuit board with electronic components properly soldered, wireless communication module, printed circuit boards to keyboard and display, among electric wires/cables and specific electronic components.

The adjustable elastic belt 151, present in all the modalities of the mobile communication device 111,150,200,220,335 and the remote sensor 160,210,257,392,412, has Velcro straps or adhesive portions 153,152 that allow a correctly and safely ergonometric positioning onto the user's body.

The electronic device of the present invention, through the mobile communication device 1 and/or the remote sensor 4 also provide applications to the user, such as: personal agenda, calendar, games, play list editor, sound settings, graphic equalizer, advanced configurations, file editor, contact list, alarm clock and clock. These applications are preferentially found in the mobile communication device 1; however, applications can be presented on the remote sensor 4 that also can interact with the applications of the device 1.

The invention claimed is:

1. An electronic device that comprises means of transferring data by cell phone network communication and further comprises musical instrument functionalities, wherein the electronic device comprises:
   a mobile communication device that comprises
      at least one radio frequency module compatible with cellular network communication systems;
      a storage means storing parameters, the parameters including synchronism, rhythm, intensity, selected document and musical note; and
      a digital signal processor configured to receive responses of impulses generated from a plurality of touch sensors while a song is being played in the electronic device, and transform said responses of impulses into musical instruments sounds,
   wherein the digital signal processor is further configured to mix the musical instruments sounds with the sound of the song that is being played in the electronic device,
   wherein the electronic device is further operable to evaluate a user's performance related to instrumental accompaniment of the musical instruments sound with the sound of the song by reference to the parameters stored by the storage means, and
   wherein the electronic device further comprises at least one remote sensor associated to the mobile communication device, the remote sensor comprising the plurality of touch sensors distributed on a surface of the remote sensor, providing regions that are touch sensitive, for generating said responses of impulses.

2. The electronic device according to claim 1, wherein the electronic device further comprises at least one adaptor to deliver the sounds created by the digital signal processor to a sound system.

3. The electronic device according to claim 1, wherein the digital signal processor carries out voice signals, sounds, communication indicators, and songs, controls communication functions, and mixes two or more of such sounds.

4. The electronic device according to claim 3, wherein sound signals carried out by the digital signal processor are stored in Flash memory devices or in memory cards.

5. The electronic device according to claim 1, wherein LEDs are distributed under a surface of the remote sensor, the surface being a pad or a Jog disc, to provide luminous indication to a user's touch.

6. The electronic device according to claim 1, wherein the touch sensors comprise transducers of piezoelectric, capacitive, resistive, inductive, field effect, pressure, stretch, vibration, displacement, vibration or acceleration type.

7. The electronic device according to claim 1, wherein the remote sensor comprises an adjustable elastic belt which contains adhesive portions.

8. The electronic device according to claim 1, wherein the electronic device comprises a communication system providing communication with at least one remote sensor, said communication being made by radio frequency, ultrasound or infrared light.

9. The electronic device according to claim 8, wherein the communication system establishes communication with a computer, with the distinct sound system, and with the adaptor, changing data and information with a plurality of audio and video electronic devices.

10. The electronic device according to claim 9, wherein the communication system is controlled by the digital signal processor of the mobile communication device.

11. The electronic device according to claim 1, wherein the electronic device comprises a computer communication interface.

12. The electronic device according to claim 1, wherein the electronic device comprises at least a graphic display, a microphone, a phone and a keyboard.

13. The electronic device according to claim 12, wherein the microphone is configured to receive a user's sounds by means different from the touches in the regions that are touch sensitive,
    wherein the microphone is configured to receive the user's sounds while a song is being played in the electronic device; and
    wherein the digital signal processor is further configured to interpret the user's sounds received by the microphone and transform the user's sounds into musical instruments sounds.

* * * * *